(12) United States Patent
Watanabe et al.

(10) Patent No.: US 8,560,558 B2
(45) Date of Patent: Oct. 15, 2013

(54) COMPUTER PRODUCT, SEARCH APPARATUS, MANAGEMENT APPARATUS, SEARCH METHOD, AND MANAGEMENT METHOD

(75) Inventors: Takashi Watanabe, Kawasaki (JP); Yoshihiro Tsuchiya, Kawasaki (JP); Yasuo Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 351 days.

(21) Appl. No.: 13/064,674

(22) Filed: Apr. 7, 2011

(65) Prior Publication Data

US 2011/0270852 A1    Nov. 3, 2011

(30) Foreign Application Priority Data

Apr. 28, 2010  (JP) ................................ 2010-104013
Apr. 28, 2010  (JP) ................................ 2010-104014
Apr. 28, 2010  (JP) ................................ 2010-104015

(51) Int. Cl.
*G06F 7/00*      (2006.01)
*G06F 17/30*     (2006.01)

(52) U.S. Cl.
USPC ............................................ 707/756; 707/802

(58) Field of Classification Search
None
See application file for complete search history.

(56) References Cited

U.S. PATENT DOCUMENTS

| | | | |
|---|---|---|---|
| 8,301,650 B1 * | 10/2012 | Oliver ........................... | 707/758 |
| 2004/0220904 A1 * | 11/2004 | Finlay et al. ..................... | 707/3 |
| 2007/0078827 A1 * | 4/2007 | Sareen et al. .................... | 707/3 |
| 2008/0071903 A1 * | 3/2008 | Schuba et al. ................. | 709/224 |
| 2009/0070358 A1 * | 3/2009 | Tokura et al. ................. | 707/101 |
| 2010/0082648 A1 * | 4/2010 | Potapov et al. ............... | 707/756 |
| 2010/0332765 A1 * | 12/2010 | Cypher ........................ | 711/141 |
| 2011/0035805 A1 * | 2/2011 | Barkan et al. .................. | 726/26 |

FOREIGN PATENT DOCUMENTS

| | | |
|---|---|---|
| JP | 03-070049 | 3/1991 |
| JP | 04-018895 | 1/1992 |
| JP | 07-177139 | 7/1995 |
| JP | 2003-289495 | 10/2003 |
| JP | 2007-052698 | 3/2007 |

OTHER PUBLICATIONS

Wang, Yi. NameFilter: Achieving fast name lookup with low memory cost via applying two-stage Bloom fitlers. 2013, 5 pages.*

* cited by examiner

*Primary Examiner* — Alicia Lewis
(74) *Attorney, Agent, or Firm* — Staas & Halsey LLP

(57) ABSTRACT

A computer-readable, non-transitory medium stores therein a search program that causes a computer having access to a data block set that includes data groups respectively registered in data blocks, and a Bloom filter row of n Bloom filters that each have m bits indicating negativity in a given number of the data blocks, to execute a process that includes receiving a transposition request for the Bloom filter row; transposing the Bloom filter row into a transposed Bloom filter row of m transposed Bloom filters respectively of n bits gathered from the Bloom filters according to arrangement position in the Bloom filters; and storing the transposed Bloom filter row to a storage device, if a transposition request has been received at the receiving.

16 Claims, 24 Drawing Sheets

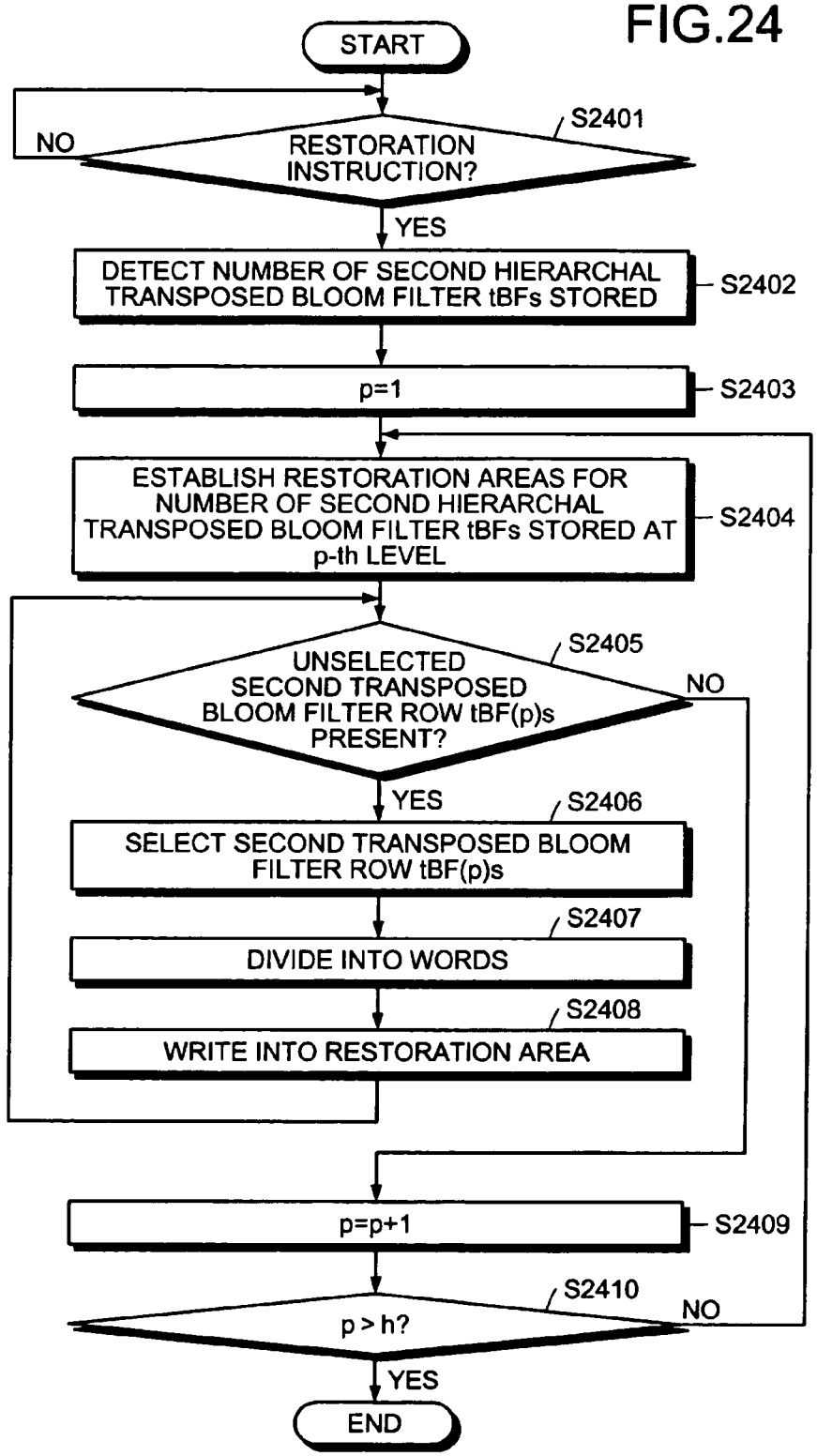

COMPUTER PRODUCT, SEARCH APPARATUS, MANAGEMENT APPARATUS, SEARCH METHOD, AND MANAGEMENT METHOD

CROSS REFERENCE TO RELATED APPLICATIONS

This application is based upon and claims the benefit of priority of the prior Japanese Patent Application No. 2010-104013, 2010-104014 and 2010-104015, filed on Apr. 28, 2010, the entire contents of which are incorporated herein by reference.

FIELD

The embodiment discussed herein is related to using bloom filters for searching and management of the bloom filters.

BACKGROUND

Conventionally, when a large amount of data is managed in a tree-structure, management by a data structure called a B-tree is performed for a majority of the cases. Since a B-tree stores multiple data entries in 1 block, as compared to a simple binary-tree, a B-tree has the advantage of narrowing the effect that a change in the tree structure has even if more data entries are added. For this reason, B-trees are often used as a data management method for disks, such as hard disks.

However, when data managed by tree structures is searched on a disk, multiple data blocks have to be read. Typically, input/output (I/O) with respect to the disk is a relatively slow process compared to memory access; consequently, data searches performed with respect to a disk are troublesome and time consuming.

For this reason, recently, countermeasures to avoid disk I/O search delays have been given consideration, such as providing a tree structure in the memory. Nevertheless, if the number of data entries becomes numerous, the amount of memory required correspondingly increases. Consequently, a method is also considered where a scheme of storing to the memory, only the portions of tree structures that will be read most often is employed (cache).

Meanwhile, recently, a data structure called a Bloom filter has come to be known. A Bloom filter is a method of efficiently finding out whether an entry belongs to an existing set. Further, in the management of electronic private branch exchange dial pulses, group processing of a pulse speed bit and an even/odd bit provided in a dial pulse has been disclosed. In addition, a method of repeated transposition and substitution by a data mixer circuit applicable for encryption and authentication has been disclosed.

A technique has also been disclosed that reduces processing time by merging a "user index" for each user, a "group index" used by multiple users, and a "system shared-index" used by all of the users. Yet another technique has been disclosed where a variable length index is added to a fixed length area and if overflow is determined, key frame information is removed from the index, establishing an available area. Refer to Japanese Laid-Open Patent Publication No. 2007-52698, Japanese Laid-Open Patent Publication No. H4-18895, Japanese Laid-Open Patent Publication. No. H7-177139, and Japanese Laid-Open Patent Publication No. 2003-289495 for examples of the aforementioned techniques.

As described, since a B-tree can handle a large quantity of data, if cache is properly implemented, disk I/O can be reduced. However, the number of disk I/O cannot be reduced beyond a given amount. Further, if the tree structure changes due to an addition of data entries, I/O for tree structure management becomes necessary. With the Bloom filter, since only the existence of a data entry is known, the Bloom filter cannot be used as is for data management.

If an index is removed when there is overflow from an available area, a bit string in the Bloom filter changes and during a search, despite actually being registered, the data is errantly determined to not be in the retrieved block. Further, despite not actually being registered, the data is errantly determined to be in the retrieved block, whereby the occurrence of false positives increases.

SUMMARY

According to an aspect of an embodiment, a computer-readable, non-transitory medium stores therein a search program that causes a computer having access to a data block set that includes data groups respectively registered in data blocks, and a Bloom filter row of n Bloom filters that each have m bits indicating negativity in a given number of the data blocks, to execute a process that includes receiving a transposition request for the Bloom filter row; transposing the Bloom filter row into a transposed Bloom filter row of m transposed Bloom filters respectively of n bits gathered from the Bloom filters according to arrangement position in the Bloom filters; and storing the transposed Bloom filter row to a storage device, if a transposition request has been received at the receiving.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 24 is a flowchart of integration/restoration processing by the storage/restoration processing unit.

DESCRIPTION OF EMBODIMENTS

Preferred embodiments of the present invention will be explained with reference to the accompanying drawings.

Figure 1:
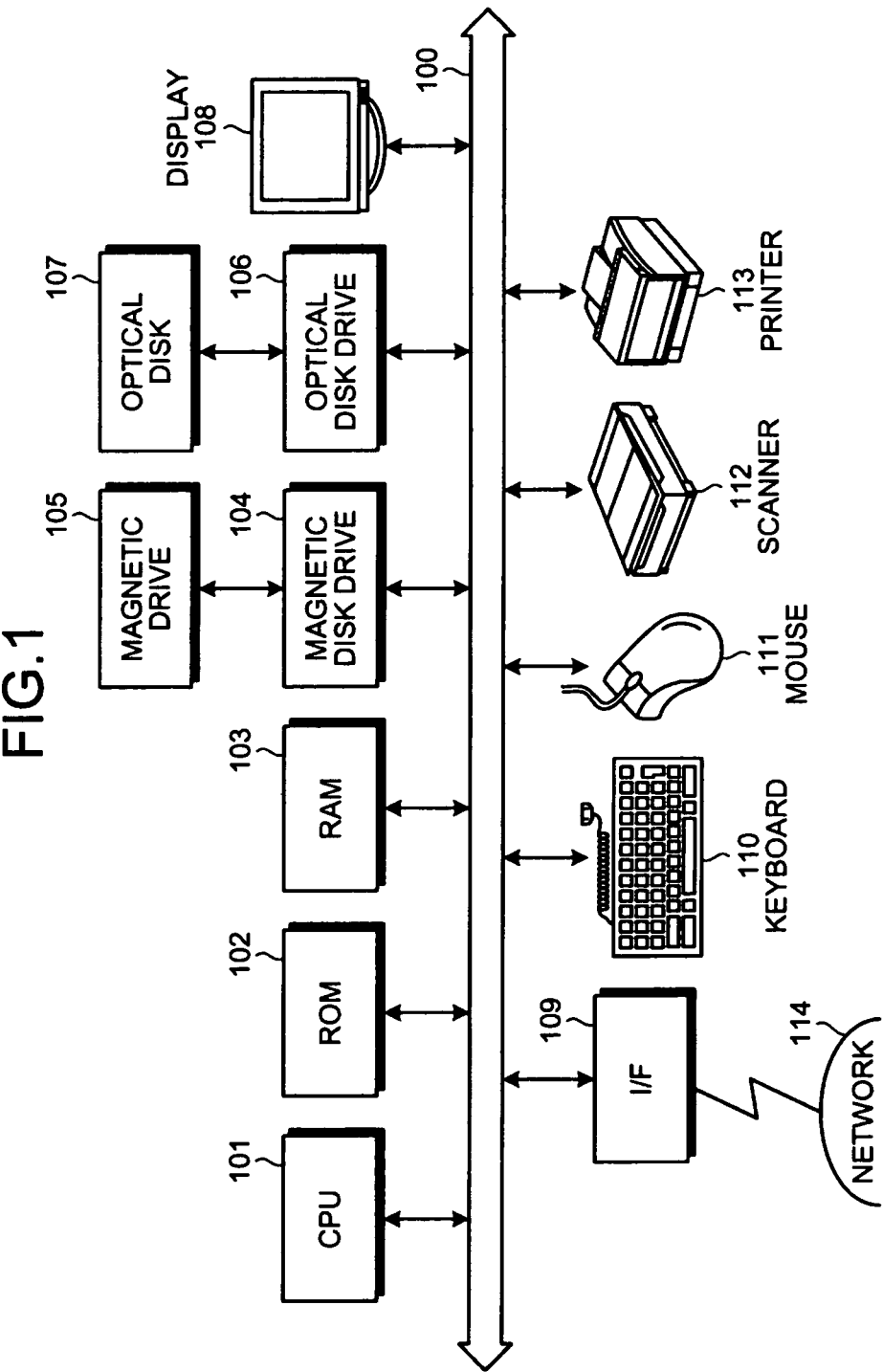
FIG. 1 is a block diagram of a hardware configuration of a management apparatus according to an embodiment.

FIG. 1 is a block diagram of a hardware configuration of a management apparatus according to the embodiment. As depicted in FIG. 1, the management apparatus includes a central processing unit (CPU) 101, a read-only memory (ROM) 102, a random access memory (RAM) 103, a magnetic disk drive 104, a magnetic disk 105, an optical disk drive 106, an optical disk 107, a display 108, an interface (I/F) 109, a keyboard 110, a mouse 111, a scanner 112, and a printer 113, respectively connected by a bus 100.

The CPU 101 governs overall control of the management apparatus. The ROM 102 stores therein programs such as a boot program. The RAM 103 is used as a work area of the CPU 101. The magnetic disk drive 104, under the control of the CPU 101, controls the reading and writing of data with respect to the magnetic disk 105. The magnetic disk 105 stores therein data written under control of the magnetic disk drive 104.

The optical disk drive 106, under the control of the CPU 101, controls the reading and writing of data with respect to the optical disk 107. The optical disk 107 stores therein data written under control of the optical disk drive 106, the data being read by a computer.

The display 108 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 108.

The I/F 109 is connected to a network 114 such as a local area network (LAN), a wide area network (WAN), and the Internet through a communication line and is connected to other apparatuses through the network 114. The I/F 109 administers an internal interface with the network 114 and controls the input/output of data from/to external apparatuses. For example, a modem or a LAN adaptor may be employed as the I/F 109.

The keyboard 110 includes, for example, keys for inputting letters, numerals, and various instructions and performs the input of data. Alternatively, a touch-panel-type input pad or numeric keypad, etc. may be adopted. The mouse 111 is used to move the cursor, select a region, or move and change the size of windows. A track ball or a joy stick may be adopted provided each respectively has a function similar to a pointing device.

The scanner 112 optically reads an image and takes in the image data into the management apparatus. The scanner 112 may have an optical character recognition (OCR) function as well. The printer 113 prints image data and text data. The printer 113 may be, for example, a laser printer or an ink jet printer.

Figure 2:
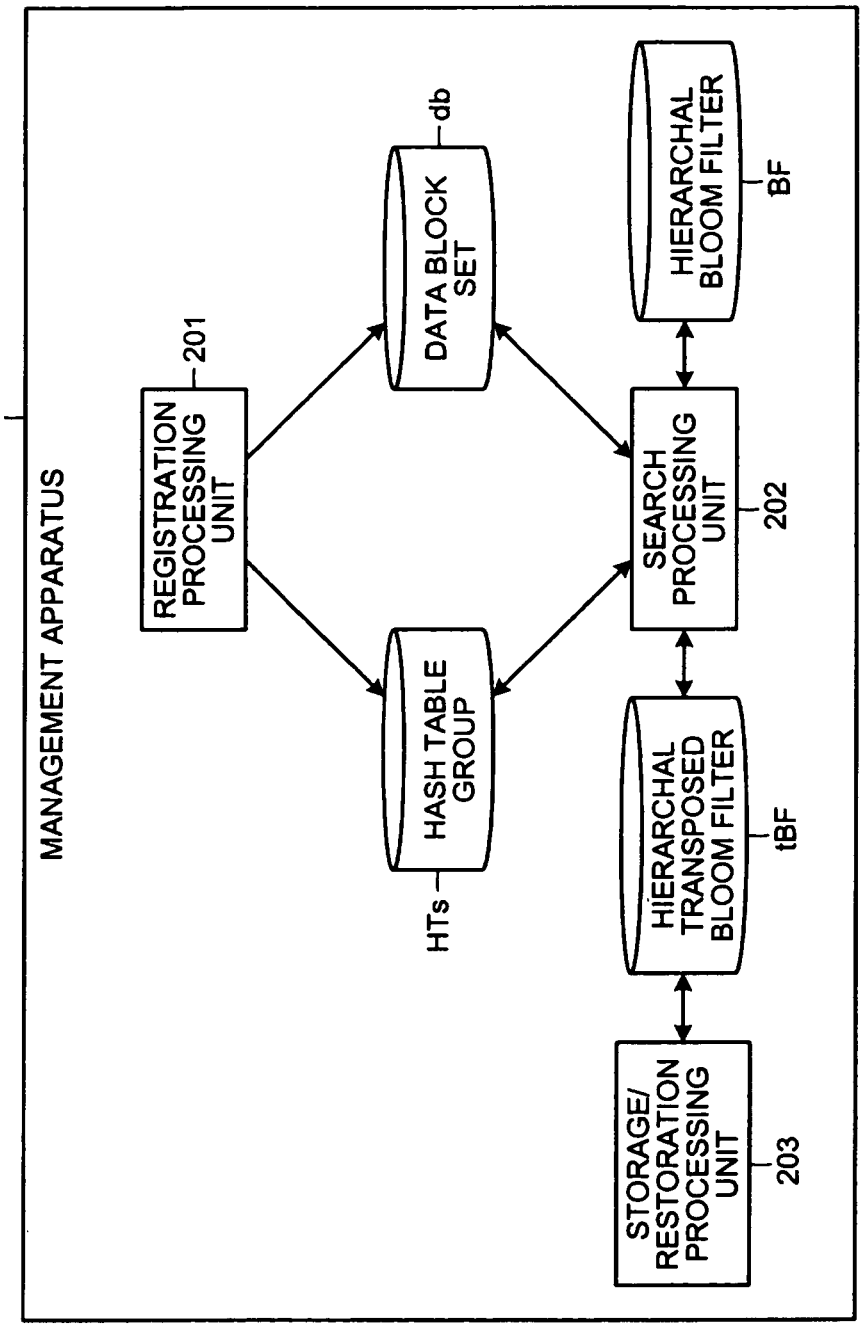
FIG. 2 is a block diagram of an exemplary configuration of the management apparatus according to the embodiment.

FIG. 2 is a block diagram of an exemplary configuration of the management apparatus according to the embodiment. A management apparatus 200 includes a data block set db, a hash table group HTs, a hierarchal Bloom filter BF, a hierarchal transposed Bloom filter tBF, a registration processing unit 201, a search processing unit 202, and a storage/restoration processing unit 203.

The data block set db has multiple data blocks, each data block having registered data. Each of the data blocks is marked with a "db#", where # is a numeral indicating the block number of the block. The data block number # corresponds to the bit position of the data block db#.

The hash table group HTs is a set of hash tables respectively corresponding to the data blocks in the data block set db. Each of the hash tables is marked with an "HT#", where # is a numeral coinciding with the block number of the data block db#. The hash table HT# is a table correlating a hash value obtained when data is provided to a given hash function and the data (may be the data itself or a pointer to the data) from which the hash value is generated.

Figure 3:
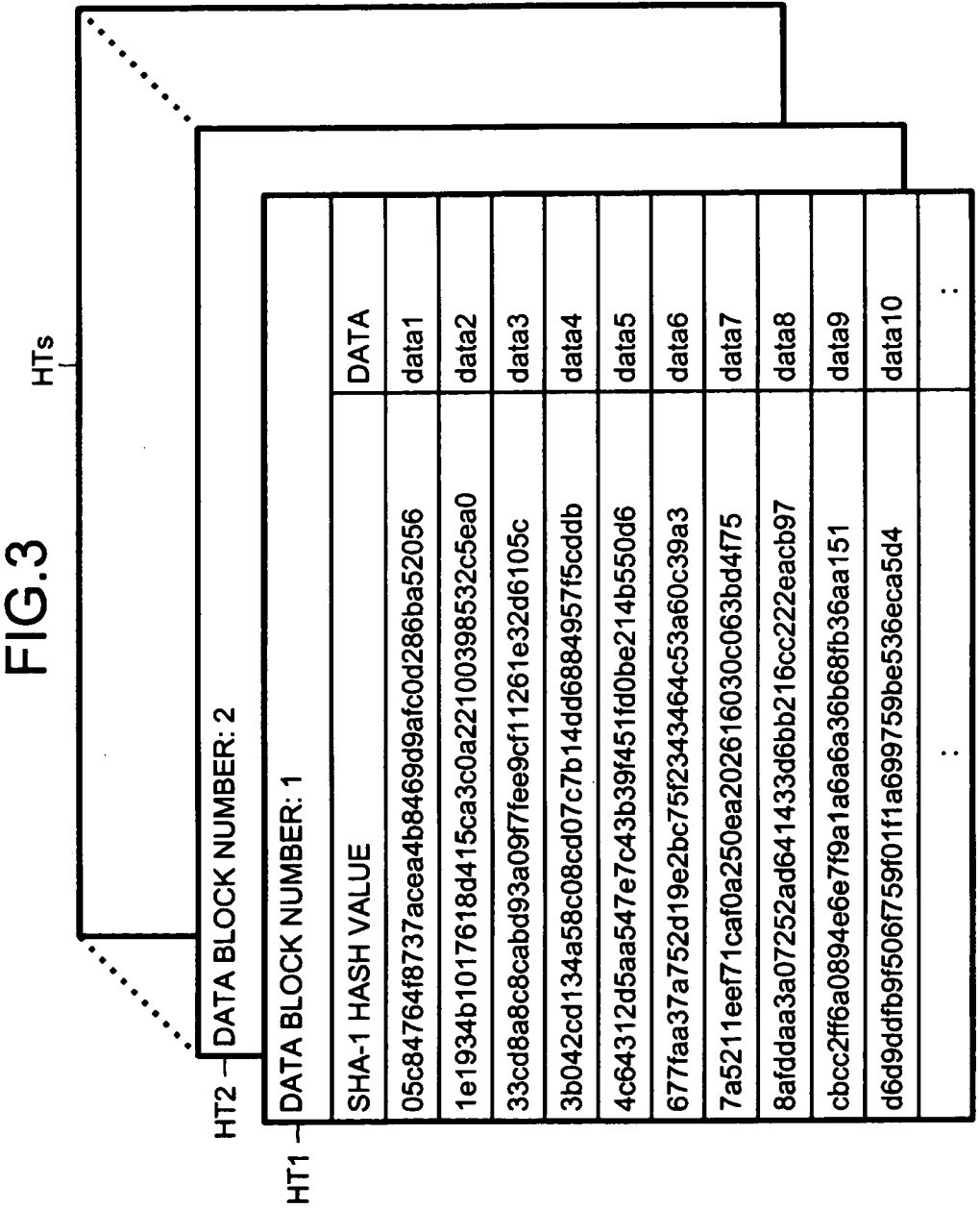
FIG. 3 depicts one example of a hash table group.

FIG. 3 depicts one example of the hash table group HTs. In FIG. 3, SHA-1 is used as the hash function. The hash function that is to be used may be set in advance.

In FIG. 2, the hierarchal Bloom filter BF is index information of a Bloom filter having a hierarchical structure. The hierarchal Bloom filter BF is described hereinafter. The Bloom filter is index information indicating false positives/negatives of arranged bits. A Bloom filter bit that is "ON" indicates a positive, a Bloom filter that is "OFF" indicates a negative. A bit value of "1" is "ON" whereas a value of "0" is "OFF"; alternatively, a bit value of "0" may indicate "ON" whereas a value of "1" indicates "OFF". In the present embodiment, a bit value of "1" indicates "ON" while a value of "0" indicates "OFF".

The hierarchal transposed Bloom filter tBF is index information of a hierarchal Bloom filter BF that has been transposed. The hierarchal transposed Bloom filter tBF is generated by the search processing unit 202. The hierarchal transposed Bloom filter tBF is described in detail hereinafter.

The data block set db, the hash table group HTs, and the hierarchal Bloom filter BF are stored to a storage device, such as the ROM 102, the RAM 103, and the magnetic disk 105 depicted in FIG. 1. Although FIG. 2 depicts storage in the management apparatus 200, the data block set db, the hash table group HTs, and the hierarchal Bloom filter BF may be stored in an external apparatus independent of the management apparatus 200 and in which case are read out from and written to the external apparatus by the management apparatus 200 via the network.

If data that is to be registered into the data block set db is entered, the registration processing unit 201 registers the data to an available area in the data block set db. Upon registration of the data, a hash value is obtained from a hash function and, the hash value and the data (or the pointer thereof) are added to the hash table HT# corresponding to the intended data block db#. The registration processing unit 201 updates the hierarchal Bloom filter BF to cause the hierarchal Bloom filter BF to learn of the data newly registered to the data block db#.

If data that is to be search for (search data) has been input, the search processing unit 202 refers to the hierarchal Bloom filter BF and identifies a data block db# having the data. If no data block db# having the data is identified, the data is not present in any of the data block db# (negative). On the contrary, even if a data block db# is identified to have the data, the identified data block db# may not necessarily have the data (false positive).

Whether a false positive is positive or negative lies in the search result of the hash table HT# corresponding to the data block db# ultimately identified by the search processing unit 202. For example, in the hash table HT# corresponding to the data block db# ultimately identified by the search processing unit 202, if the hash value of the search data is hit: positive and if the search data is not hit: negative.

Although the storage/restoration processing unit 203 is described in detail hereinafter, the hierarchal Bloom filter BF and a hierarchal transposed Bloom filter tBF described hereinafter are saved and restored. The hierarchal Bloom filter BF and the hierarchal transposed Bloom filter tBF are saved to, for example, a storage device such as the ROM 102, the RAM 103, the magnetic disk 105 and the optical disk 107 depicted in FIG. 1, a storage area of the management apparatus 200, or a storage device independent of the management apparatus 200.

Functions of the registration processing unit 201 to the storage/restoration processing unit 203 are implemented, for example, by executing on the CPU 101, a program stored in a storage device such as the ROM 102, the RAM 103, the magnetic disk 105, and the optical disk 107 depicted in FIG. 1.

Figure 4:
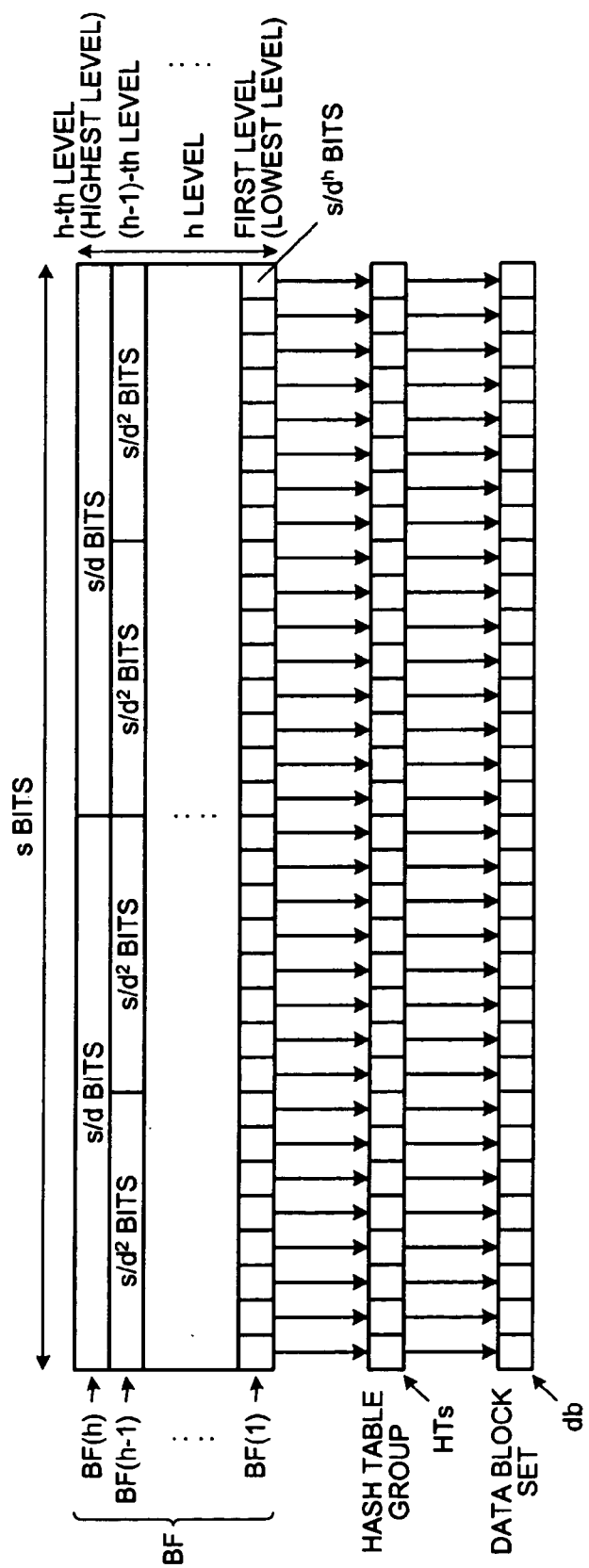
FIG. 4 depicts one example of a hierarchal Bloom filter.

FIG. 4 depicts one example of the hierarchal Bloom filter BF. The hierarchal Bloom filter BF is configured by a memory area of h-levels×s-bits. The width of s-bits corresponds to the bit width of the data block set db. The bit length s of each level is divided based on a divider d of the highest level, the h-th level. Each of the segments resulting from the division is a Bloom filter and the segments at each level constitute a Bloom filter row. The divider d, in principle, is an integer of 2 or more, but at the highest level (h-th level), if there is a single Bloom filter, d may be 1.

Assuming an arbitrary level to be p, the bit width m of the Bloom filters bf(p) constituting the p-th level Bloom filter row BF(p) is $m=s/d^{[h-(p-1)]}$. In FIG. 4, d equals 2. Further, the number (arrangement count n) of the Bloom filters bf(p) in the Bloom filter row BF(p) at the p-th level is $n=d^{[h-(p-1)]}$.

Therefore, in the, hierarchal Bloom filter BF, as the level becomes lower (h becomes smaller), the arrangement count of the Bloom filters bf(p) in Bloom filter row BF(p) at the p-th level increases. The arrangement count of the Bloom filters bf(1) in the Bloom filter row Bf(1) at the lowest level (first level) is the same as the number of data blocks db#.

Consequently, at the first level, the hit Bloom filters bf(1) and the data blocks dB# have a one-to-one correspondence. Further, although the number of levels h of the hierarchal Bloom filter BF is, in principle, plural, the number of levels may be 1 (h=1). However, in this case, d does not equal 1.

Figure 5:
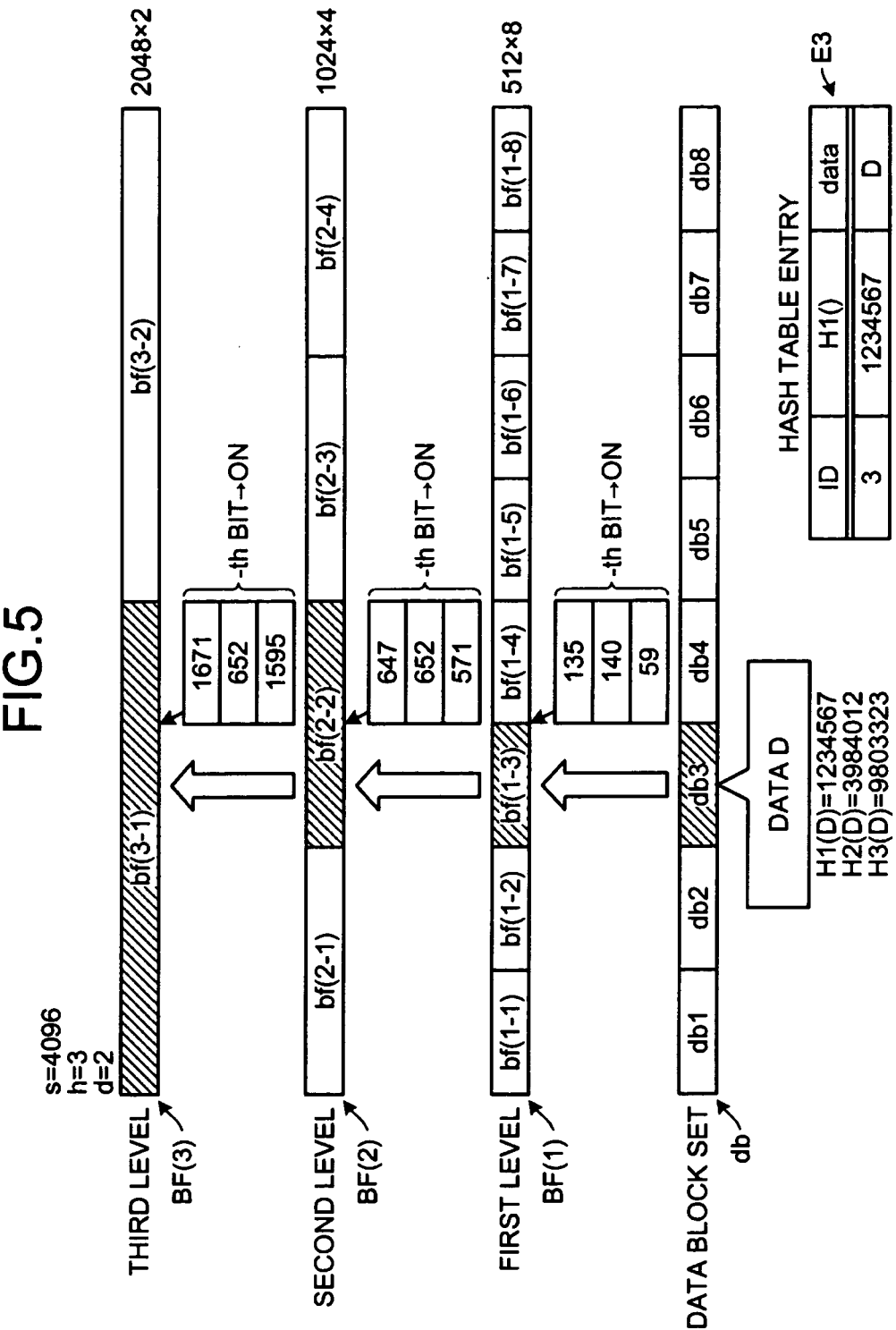
FIG. 5 depicts an example of hierarchal Bloom filter learning processing by a registration processing unit.

FIG. 5 depicts an example of hierarchal Bloom filter BF learning processing by the registration processing unit 201. To facilitate explanation, in FIG. 5, the total bit width s=4096 bits, the number of levels h=3 levels, and the divider of the h-th level is d=2.

Therefore, the Bloom filter row BF(1) at the first level (lowest level) is divided into $8(=d^{[h-(p-1)]}=2^3)$ segments and is constituted by Bloom filters bf(1-1) to bf(1-8). The Bloom filter row BF(2) at the second-level is divided into $4(=d^{[h-(p-1)]}=2^2)$ segments and is constituted by Bloom filters bf(2-1) to bf(2-4). The Bloom filter row BF(3) at the third-level (highest level) is divided into $2(=d^{[h-(p-1)]}=2^1)$ segments and is constituted by Bloom filters bf(3-1) to bf(3-2).

The number of types of hash functions to which data that is to be registered (data D) is provided is k=3. In this example, hash functions H1( ), H2( ), and H3( ) are used, where hash function H1( ) is to be registered to the hash table.

In the data block set db, data D has been registered to the data block db3. Below are examples of the hash values obtained when data D is provided to each of the hash functions H1( ), H2( ), and H3( ).

$H1(D)=1234567$ $H2(D)=3984012$ $H3(D)=9803323$

In the hierarchal Bloom filter BF learning processing, a designated bit that is in the Bloom filter to be updated is turned ON, however, if the bit is already ON, the bit is remains as is.

In this example, the registration processing unit 201 generates hash table entry E3 for hash table HT3, which corresponds to block number 3, the block number of the data block db3 to which data D has been registered. The registration processing unit 201 adds/registers the generated hash table entry E3 to hash table HT3.

The registration processing unit 201 designates the Bloom filter to be updated in the Bloom filter row BF(1) at the first level. At the lowest level, the Bloom filter bf(1-3) has the same arrangement number corresponding to block number 3, the block number of the data block db3 to which data D has been registered. Therefore, the Bloom filter bf(1-3) is to be updated. The Bloom filter bf(1-3) is a bit string of 512 bits.

The registration processing unit 201 divides each hash value by 512, the bit width of the Bloom filter bf(1) at the first level, to calculate the remainder. Here, the remainder of hash value H1(D) is 135; the remainder of hash value H2(D) is 140; and the remainder of hash value H3(D) is 59.

In the Bloom filter that is to be updated, the registration processing unit 201 turns ON the bits at the positions corresponding to the remainders. If the remainder is 0, the bit at the tail of the Bloom filter to be updated is turned ON. In the example depicted in FIG. 5, the Bloom filter bf(1-3) has 512 bits and therefore, for the remainder of 135, the bit 135th from the head is turned ON. Similarly, for the remainder of 140, the bit 140th from the head is turned ON and for the remainder of 59, the bit 59th from the head is turned ON, whereby the learning processing at the first level ends.

The processing transitions to learning processing at the second level. The registration processing unit 201 designates the Bloom filter to be updated from the Bloom filter row BF(2) at the second level. For example, the Bloom filter that includes the bit position of the Bloom filter bf(1-3) updated at the first level is designated from the Bloom filter row BF(2) at the second level. In the present example, the Bloom filter bf(2-2) is designated. More specifically, the arrangement number "3" of the Bloom filter bf(1-3) updated previously at the first level is divided by divider d(=2) and the quotient is rounded up, yielding 2 as the arrangement number of the Bloom filter to be updated. Therefore, the Bloom filter bf(2-2) is designated.

The registration processing unit 201 divides each of the hash values by 1024, the bit width of the Bloom filter bf(2) at the second level, to calculate the remainder. In this example, the remainder of hash value H1(D) is 647; the remainder of hash value H2(D) is 652; and remainder of hash value H3(D) is 571.

In the Bloom filter that is to be updated, the registration processing unit 201 turns ON the bits at the positions corresponding to the remainders. If the remainder is 0, the bit at the tail of the Bloom filter to be updated is turned ON. In the example depicted in FIG. 5, the Bloom filter bf(2-2) has 1024 bits and therefore, for the remainder of 647, the bit 647th from the head is turned ON. Similarly, for the remainder 652, the bit 652nd from the head is turned ON and for the remainder 571, the bit 571st from the head is turned ON, whereby the learning processing at the second level ends.

The processing transitions to learning processing at the third level, the highest level. The registration processing unit 201 designates the Bloom filter to be updated from the Bloom filter row BF(3) at the third level. For example, a Bloom filter that includes the bit position of the Bloom filter bf(2-2) updated at the second level is designated from the Bloom filter row BF(3) at the third level. In the present example, the Bloom filter bf(3-1) is designated. More specifically, the arrangement number "2" of the Bloom filter bf(2-2) updated previously at the second level is divided by divider d(=2), yielding 1 as the arrangement number of the Bloom filter to be updated. Therefore, the Bloom filter bf(3-1) is designated.

The registration processing unit 201 divides each of the hash values by 2048, the bit width of the Bloom filter bf(3) at the third level, to calculate the remainder. In this example, the remainder for H1(D) is 1671; the remainder for H2(D) is 652; and the remainder for H3(D) is 1595.

In the Bloom filter that is to be updated, the registration processing unit 201 turns ON the bits at the positions corresponding to the remainders. If the remainder is 0, the bit at the tail of the Bloom filter to be updated is turned ON. In the example depicted in FIG. 5, the Bloom filter bf(3-1) has 2048 bits and therefore, for the remainder of 1671, the bit 1671st from the head is turned ON. Similarly, for the remainder 652, the bit 652nd from the head is turned ON and for the remainder of 1595, the bit 1595th from the head is turned ON, whereby the learning processing at the third level ends.

According to this procedure, the registration processing unit 201 causes the hierarchal Bloom filter BF to learn of the data entry.

Figure 6:
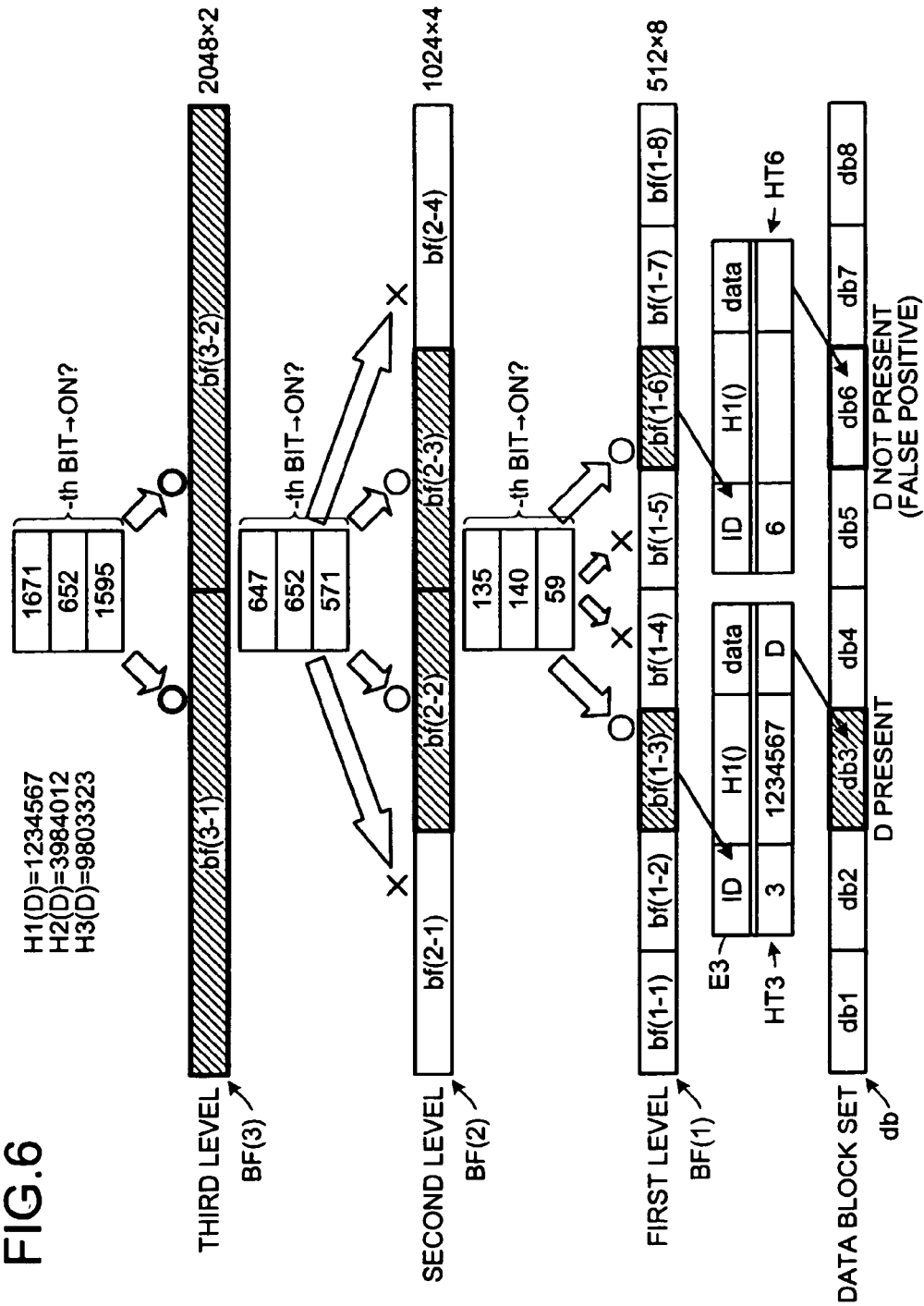
FIG. 6 depicts an example of processing by a search processing unit to search the hierarchal Bloom filter.

FIG. 6 depicts an example of processing by the search processing unit 202 to search the hierarchal Bloom filter BF. In FIG. 6, the same hierarchal Bloom filter BF depicted in FIG. 5 will be used to describe an example where the data (data D) registered in the example depicted in FIG. 5 is data to be searched for.

In the learning processing depicted in FIG. 5, processing began from the lowest level (the first level); however, in the search processing, processing begins from the highest level (in FIG. 6, the third level). The search processing unit 202 obtains for each of the 3 hash values for data D, the remainder (1671, 652, 1595) calculated by dividing the hash value by 2048, the bit width of each Bloom filter bf(3) at the third level.

The search processing unit 202 designates from the Bloom filter row BF(3) at the third level, a Bloom filter(s) to be filtered out. Since the third level is the highest level, all Bloom filters bf(3-1) and bf(3-2) of the third level are unconditionally designated.

From among the Bloom filters designated to be filtered out, the search processing unit 202 designates a Bloom filter(s) in which all of the bits at the positions corresponding to the calculated remainders are ON. For the third level, in this example, in each of the Bloom filters bf(3-1), bf(3-2), the bits at the positions corresponding to the calculated remainders are ON. Consequently, the filtering processing at the third level ends.

The processing transitions to filtering processing at the second level. The search processing unit 202 obtains for each of the 3 hash values for data D, the remainder (647, 652, 571) calculated by dividing the hash value by 1024, the bit width of each Bloom filter bf(2) at the second level.

The search processing unit 202 designates from the Bloom filter row BF(2) at the second level, a Bloom filter(s) to be filtered out. Here, if the level is not the highest level, a Bloom filter bf(p+1) is searched for in which all of the bits at the positions corresponding to the remainders calculated at the level that is 1-level higher are ON, and the Bloom filter(s) bf(p) included at the bit positions of the Bloom filter bf(p+1) is designated to be filtered out.

For the second level, in this example, the Bloom filters bf(2-1) to bf(2-4) included at the bit positions of the Bloom filters bf(3-1), bf(3-2) in which all of the bits at the positions corresponding to the remainders calculated at the third level are ON, are designated to be filtered out.

From among the Bloom filters designated to be filtered out, the search processing unit 202 designates a Bloom filter(s) in which all of the bits at the positions corresponding to the calculated remainders are ON. For the second level, in this example, in each of the Bloom filters bf(2-2), bf(2-3), the bits at the positions corresponding to the calculated remainders are ON, whereas, in the Bloom filters bf(2-1), bf(2-4), the bits at the positions corresponding to the calculated remainders are all OFF.

Therefore, the Bloom filters bf(1-1), bf(1-2), bf(1-7), and bf(1-8) of the lower level and included at the bit positions of the Bloom filters bf(2-1), bf(2-4) are designated to be filtered out and the data block db# in which data D is present is narrowed to the data block db# included at the bit positions of the Bloom filters bf(2-2), bf(2-3), whereby the filtering processing at the second level ends.

The processing transitions to filtering processing at the first level, the lowest level. The search processing unit 202 obtains for each of the 3 hash values for data D, the remainder (135, 140, 59) calculated by dividing the hash value by 512, the bit width of each Bloom filter bf(1) at the first level.

The search processing unit 202 designates from the Bloom filter row BF(1) at the first level, a Bloom filter(s) to be filtered out. For the first level, in this example, the Bloom filters bf(1-3) to bf(1-6) included at the bit positions of the Bloom filters bf(2-2), bf(2-3) in which all of the bits at the positions corresponding to the remainders calculated at the second level are ON, are designated to be filtered out.

From among the Bloom filters designated to be filtered out, the search processing unit 202 designates a Bloom filter(s) in which all of the bits at the positions corresponding to the calculated remainders are ON. For the first level, in this example, in each of the Bloom filters bf(1-3), bf(1-6), the bits at the positions corresponding to the calculated remainders are ON, whereas, in the Bloom filters bf(1-4), bf(1-5), the bits at the positions corresponding to the calculated remainders are all OFF.

At the lowest level, since no lower levels exist, among the Bloom filters bf(1-3), bf(1-6) has a false positive. The search processing unit 202 determines whether the hash value H1(D) is registered in the hash table HT3 corresponding to the arrangement number "3" of the designated Bloom filter bf(1-3). Since entry E3 is registered in the hash table HT3, clearly, data D is registered in the data block db3 corresponding to the hash table HT3.

Meanwhile, the search processing unit 202 determines whether the hash value H1(D) is registered in the hash table HT6 corresponding to the arrangement number "6" of the designated Bloom filter bf(1-6). Since the hash value H1(D)=1234567 is not registered in the hash table HT6, clearly, data D is not registered in the data block db6 corresponding the hash table HT6, whereby the search processing ends.

According to this procedure, the search processing unit 202 is able to identify the data block in which data D is present, by using the hierarchal Bloom filter BF.

The effects of a Bloom filter false positive will be described.

The occurrence rate FPR of false positives for a Bloom filter having a bit length of m, h levels, N data registrations (N<m), and k hash functions, may be expressed by Bloom filter characteristics as in equation 1.

$$FPR=\{1-(1-1/m)^{kN}\}^k \approx \{1-e^{(-kN/m)}\}^k \quad (1)$$

Here, according to changes in k, m, N, the occurrence rate FPR of false positives can be made extremely small. In other words, in the present embodiment, at the setting of k, m, N, the occurrence rate FPR of false positives can be set to an extremely small value less than 1 (nearly 0). Therefore, in the example depicted in FIG. 5, the selection of Bloom filter bf(1-6) is not very likely.

In the present embodiment, the number of data blocks Ndb is dh, whereby the number of levels h and the height, may be expressed by equation 2.

$$h=\log(Ndb)/\log(d)+1 \quad (2)$$

Although equation 2 assumes divisibility of log(Ndb)/log(d), if this is not the case, by changing the value of d, which is level dependent, with that of another level, h can be determined.

With the search processing above, the number of comparisons performed corresponds to the number of hash values (k times (constant)) and the number of filtered Bloom filters at each level searched is at most d. Therefore, the number of memory accesses MA during a search, even at the maximum, is on an order expressed by equation 3.

$$MA=k \times d \times \log(Ndb)/\log(d) \quad (3)$$

In other words, the number of levels h(=memory volume) can be reduced by increasing divider d whereas the number of searches increases as divider d increases. Therefore, with consideration of this tradeoff, appropriate memory management is possible.

A hierarchal transposed Bloom filter will be described. In the description above, registration processing and search processing for the hierarchal Bloom filter BF was described, however, to increase search speed, the hierarchal Bloom filter BF is transposed.

Figure 7:
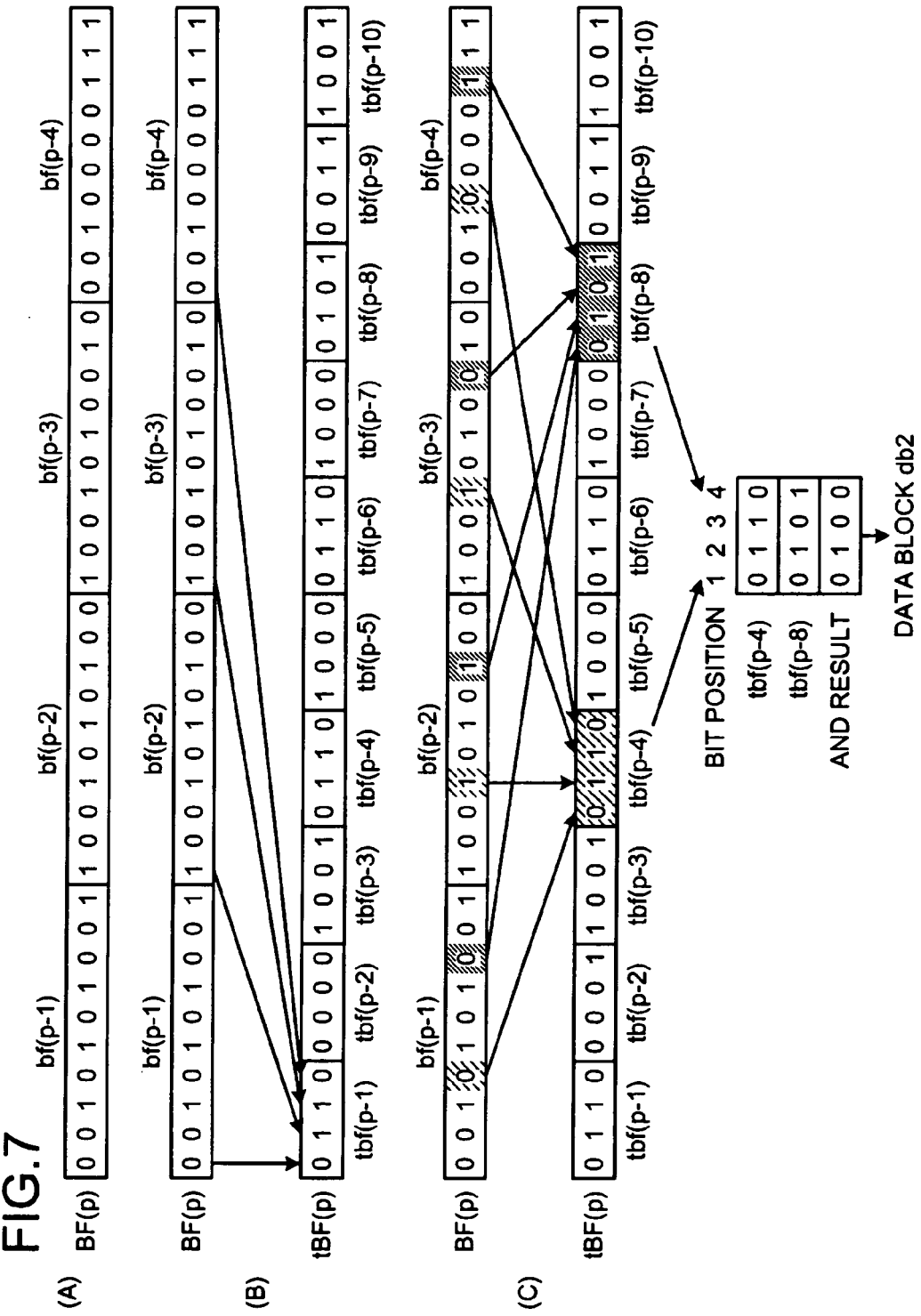
FIG. 7 depicts an example of a Bloom filter row at a p-th level in the hierarchal Bloom filter.

FIG. 7 depicts an example of a Bloom filter row bf(p) at a p-th level in the hierarchal Bloom filter BF. In FIG. 7, (A) depicts a Bloom filter row BF(p). Here, the Bloom filter row BF(p), as an example, is depicted to be separated into 4 Bloom filters bf(p-1) to bf(p-4). In other words, the Bloom filter row BF(p) is a bit string of 10 bits×4 filters and when transposed, becomes a bit string of 4 bits×10 filters.

In FIG. 7, (B) depicts transposition of the Bloom filter row BF(p). In the case of transposition, bits at identical positions in each of the Bloom filters bf(p-1) to bf(p-4) are gathered, where the strings of bits gathered according to position are arranged in order of bit position.

For example, the head bit of each of the Bloom filters bf(p-1) to bf(p-4) are collected in order of arrangement number as a bit string {0110}. From the left, the head bit "0" is the head bit of the Bloom filter bf(p-1), the second bit "1" is the head bit of the Bloom filter bf(p-2), the third bit "1" is the head bit of the Bloom filter bf(p-3), and the tail bit "0" is the head bit of the Bloom filter bf(p-4).

This bit string {0110} is called transposed Bloom filter tbf(p-1). Bits at the second to the tail bit positions are similarly collected to obtain transposed Bloom filters tbf(p-2) to tbf(p-10). Index information of the transposed Bloom filters tbf(p-1) to tbf(p-10) arranged in order of bit position is called a transposed Bloom filter row tBF(p). By generating a transposed Bloom filter row tBF(p) for each of the levels, the hierarchal transposed Bloom filter tBF is obtained.

In FIG. 7, (C) depicts a search and comparison example of the Bloom filter row BF(p) and the transposed Bloom filter row tBF(p). In this example, from 2 types of hash functions, 2 hash values for data D are obtained and by respectively dividing the hash values by 10, the bit width of the Bloom filters bf(p) constituting the Bloom filter row BF(p), and remainders of "4" and "8" are calculated.

In the case of a search at the Bloom filter row BF(p), the Bloom filter row BF(p) is searched for a Bloom filter(s) bf(p) in which all bits are ON at bit positions "4" and "8", which correspond to the remainders "4" and "8". In this case, the Bloom filter bf(p-2) corresponds.

On the other hand, if the transposed Bloom filter row tBF(p) is used, without searching for a Bloom filter(s) bf(p) in which each of the bits at the bit positions "4 and "8" are ON as with the Bloom filter row BF(p), the transposed Bloom filters tbf(p-4), tbf(p-8) having the same arrangement number as the remainders "4" and "8" are extracted. The extracted transposed Bloom filters tbf(p-4), tbf(p-8) are calculated for AND, whereby bit position "2", which is ON, is designated.

In the case of the Bloom filter row BF(p), since the 4th bit and the 8th bit in the 4 Bloom filters bf(p-1) to bf(p-4) are compared, 8(=4×2) memory accesses are necessary. On the other hand, the transposed Bloom filter row tBF(p) is index information according to bit position in the Bloom filters bf(p-1) to bf(p-4) prior to transposition. Therefore, by the extraction of the transposed Bloom filters tbf(p-4), tbf(p-8) (i.e., 2 memory accesses) and the AND calculation, determination becomes possible, whereby the frequency of memory access can be reduced and the search speed increased.

Figure 8:
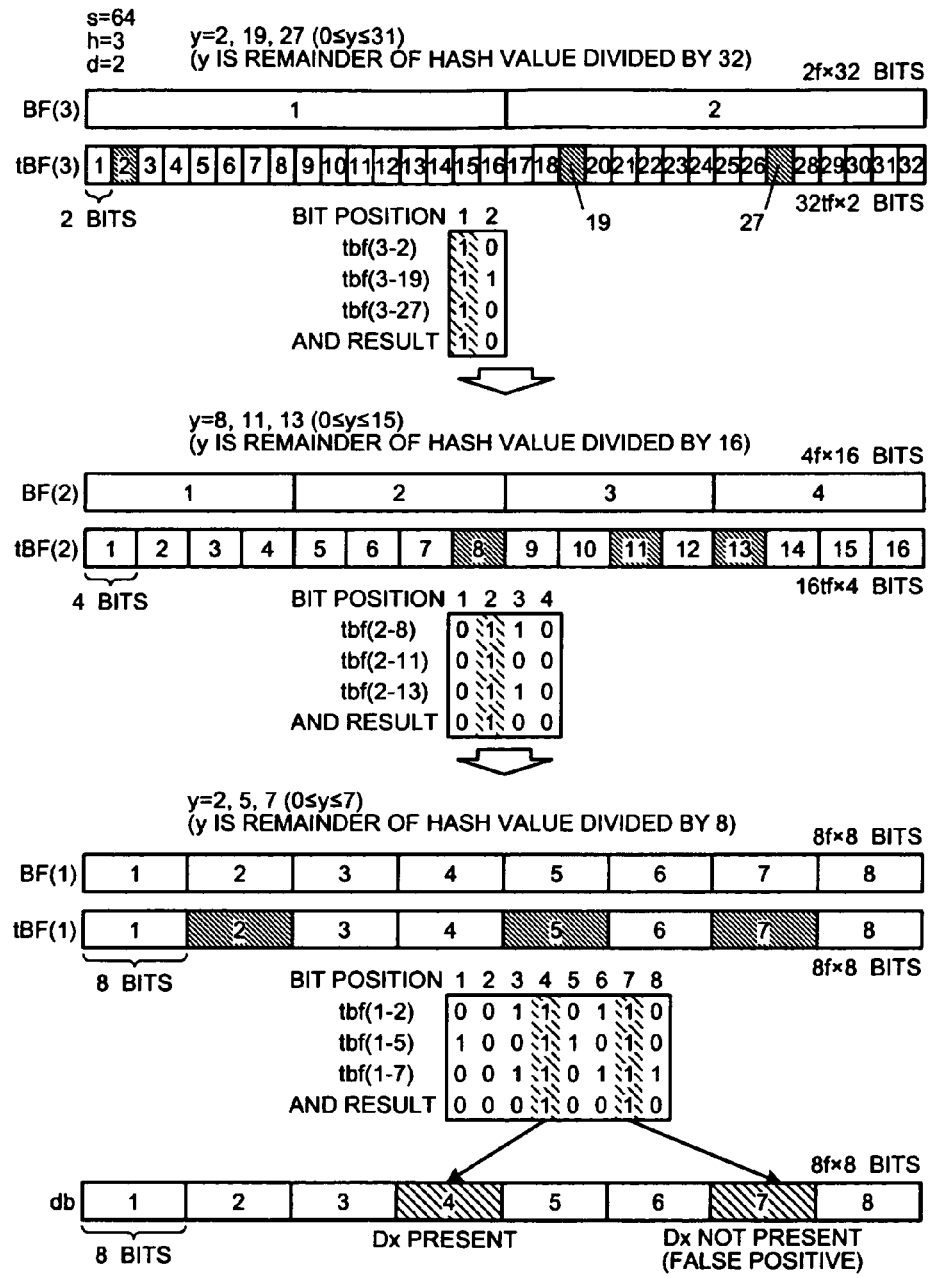
FIG. 8 depicts an example of hierarchal transposed Bloom filter search processing performed by the search processing unit.

FIG. 8 depicts an example of hierarchal transposed Bloom filter search processing performed by the search processing unit 202. In FIG. 8, as described above, the total bit width s=64 bits, the number of levels h=3 level, and at the h-th level, the divider d=2.

The bit width of the Bloom filters constituting the Bloom filter row BF(1) at the first level (lowest level) is $8(=s/d^h=64/2^3)$ bits; therefore, the transposed Bloom filter row tBF(1) at the first level (lowest level) is constituted by $8(=s/d^h=64/2^3)$ transposed Bloom filters tbf(1-1) to tbf(1-8).

The bit width of the Bloom filters constituting the Bloom filter row BF(2) at the second level is $16(=s/d^h=64/22)$ bits; therefore, the transposed Bloom filter row tBF(2) at the second level is constituted by $16(=s/d^h=64/22)$ transposed Bloom filters tbf(2-1) to tbf(2-16).

The bit width of the Bloom filters constituting the Bloom filter row BF(3) at the third level (highest level) is $32(=s/d^h=64/21)$ bits; therefore, the transposed Bloom filter row tBF(3) at the third level (highest level) is constituted by $32(=s/d^h=64/21)$ transposed Bloom filters tbf(3-1) to tbf(3-32).

In FIG. 8, the transposed Bloom filter rows tBF(1) to tBF(3) and the Bloom filter rows BF(1) to BF(3) prior to transposition are depicted together for comparison.

The search processing unit 202 divides each of the 3 hash values of the hash functions H1( ) to H3( ) for data Dx (data that is searched for) by 32, the number of transposed Bloom filters at the third level, to obtain remainders "2", "19", and "27".

The search processing unit 202 designates from the transposed Bloom filter row tBF(3) at the third level, a transposed Bloom filter(s) to be filtered out. For example, the search processing unit 202 designates the transposed Bloom filters tbf(3-2), tbf(3-19), and tbf(3-27) at the bit positions coinciding with the values of the remainders (if the remainder is 0, the tail position is used). AND calculation of the bit strings {10}, {11}, and {10} of the designated transposed Bloom filters tbf(3-2), tbf(3-19), and tbf(3-27) is performed, the result of which is {10}.

The search processing unit 202 determines that data Dx is not present in the data block set db, if "1" is not included in the AND result. On the other hand, if "1" is included in the AND result, data Dx may be registered and thus, the search processing unit 202 transitions 1 level down.

At the second level as well, the search processing unit 202 divides each of the 3 hash values for data Dx by 16, the number of transposed Bloom filters at the second level, to obtain remainders "8", "11", and "13".

The search processing unit 202 designates from the transposed Bloom filter row tBF(2) at the second level, a transposed Bloom filter(s) to be filtered out. For example, the search processing unit 202 designates the transposed Bloom filters tbf(2-8), tbf(2-11), and tbf(2-13) at the bit positions coinciding with the values of the remainders (if the remainder is 0, the tail position). AND calculation of the bit strings {0110}, {0100}, and {0110} of the designated transposed Bloom filters tbf(2-8), tbf(2-11), and tbf(2-13) is performed, the result of which is {0100}.

The search processing unit 202 determines that data Dx is not present in the data block set db, if "1" is not included in the AND result. On the other hand, if "1" is included in the AND result, data Dx may be registered and thus, the search processing unit 202 transitions 1 level down.

At the first level, the lowest level, the search processing unit 202 divides each of the 3 hash values for data Dx by 8, the number of transposed Bloom filters at the first level, to obtain remainders "2", "5", and "7".

The search processing unit 202 designates from the transposed Bloom filter row tBF(1) at the first level, a transposed Bloom filter(s) to be filtered out. For example, the search processing unit 202 designates the transposed Bloom filters tbf(1-2), tbf(1-5), and tbf(1-7) at the bit positions coinciding with the values of the remainders (if the remainder is 0, the tail position). AND calculation of the bit strings {00110110}, {10011010}, and {00110111} of the designated transposed Bloom filters tbf(1-2), tbf(1-5), and tbf(1-7) is performed, the result of which is {00010010}.

Since no lower level is present, consequent to a false positive, the data Dx may be present in the data blocks db4 and db7 corresponding to the bit positions 4 and 7 having a "1" in the AND result {00010010}.

In this example, in a search of the hash tables HT4, HT7 using the hash value of the hash function H1( ) as a key, the data block db4 is hit whereas the data block db7 is not hit. Consequently, data Dx is clearly registered in the data block db4, whereby the search processing ends.

According to such a procedure, the search processing unit 202, by using the hierarchal transposed Bloom filter is able to retrieve data faster as compared to the hierarchal Bloom filter BF.

An example of a functional configuration of the search processing unit 202 will be described.

Figure 9:
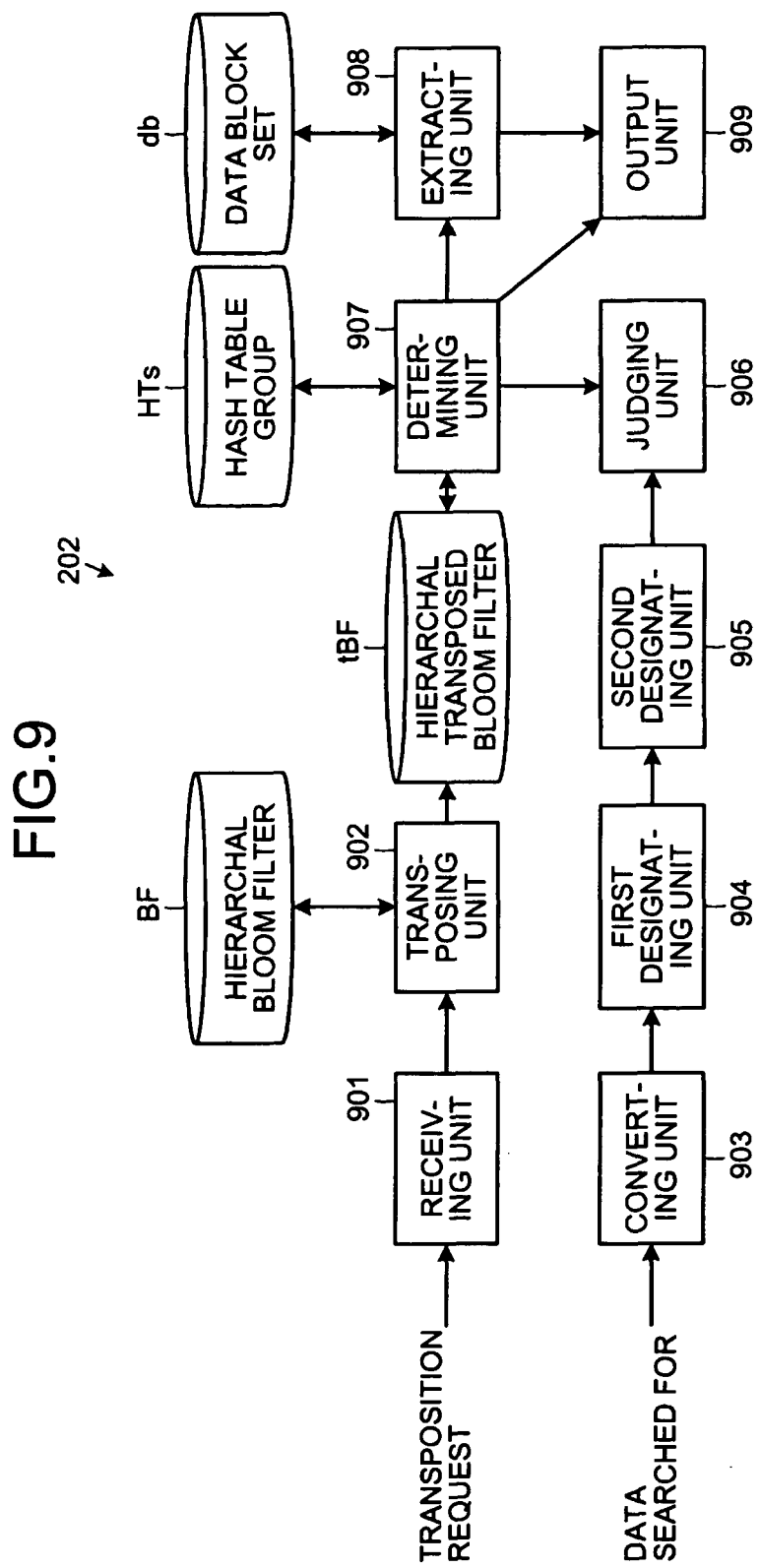
FIG. 9 is a block diagram of an example of a functional configuration of the search processing unit.

FIG. 9 is a block diagram of an example of a functional configuration of the search processing unit 202. The search processing unit 202 includes a receiving unit 901, a transposing unit 902, a converting unit 903, a first designating unit 904, a second designating unit 905, a judging unit 906, a determining unit 907, an extracting unit 908, and an output unit 909.

The receiving unit 901 has a function of receiving a transposition request for a Bloom filter row BF(p). For example, a request for transposition from the hierarchal Bloom filter BF to the hierarchal transposed Bloom filter tBF is received.

Here, a transposition request is a request for transposition of the Bloom filter row BF(p) to the transposed Bloom filter row tBF(p). For example, when the management apparatus 200 is started up, notification of completion of startup may be regarded as a transposition request. Thus, by starting up the management apparatus 200, the hierarchal Bloom filter BF is transposed into the hierarchal transposed Bloom filter tBF. Such collective transposition, at startup, into the hierarchal transposed Bloom filter tBF enables the transposed Bloom filter tBF to be used at any time until shutdown.

A search request for a data block set db may be regarded as a transposition request, whereby the search processing unit 202 remains in standby until a search request is received and upon receipt of a search request, among the hierarchal Bloom filters BF, the Bloom filter row BF(p) to be used by the search processing unit 202 is transposed. As a result, as search frequency increases and the transposed Bloom filter rows tBF(p) increase. Therefore, the hierarchal Bloom filters BF are gradually transposed from Bloom filter rows BF(p) needed for a search, whereby unnecessary transposition processing of Bloom filter rows that are not used can be reduced.

The transposing unit 902 has a function of transposing the Bloom filter row BF(p) into the transposed Bloom filter row tBF(p), if a transposition request has been received by the receiving unit 901. For example, at the transposing unit 902, the Bloom filter row BF(p) is transposed into the transposed Bloom filter row tBF(p) according to the scheme depicted in FIG. 7.

For example, the Bloom filter row BF(p) is index information of $n(=d^{[h-(p-1)]})$ arranged Bloom filters bf(p−1) to bf(p−n). Each of the Bloom filters bf(p−1) to bf(p−n) has a bit width of m(=s/n) bits.

By transposing the Bloom filter row BF(p) according the processing depicted in FIG. 7, the transposed Bloom filter row tBF(p) becomes index information of m(=s/n) arranged transposed Bloom filters tbf(p−1) to tbf(p−m). Each of the transposed Bloom filters tbf(p−1) to tbf(p−m) have a bit width of $n(=d^{[h-(p-1)]})$ bits. By such transposition, the arrangement count and the bit width become interchanged.

The converting unit 903 has a function of converting data that is to be searched for into position information indicating the arrangement position of the transposed Bloom filter, the converting being for each hash function and based on the various types of hash functions (number of types k). For example, by providing the search data to the k types of hash functions H1( ) to Hk( ), k hash values are obtained.

In the example of entry to the Bloom filter row BF(p) depicted in FIG. 5, the hash values are divided by the bit width m(=s/n) of the Bloom filters constituting the Bloom filter row BF(p); and the bit at the bit positions corresponding to the value of the remainders are each turned ON.

Consequently, the converting unit 903, upon receiving k hash values, divides the hash values by the arrangement count m(=s/n) of the transposed Bloom filters constituting the transposed Bloom filter row tBF(p). The values of the k remainders indicate the arrangement position of the transposed Bloom filter. If the calculated remainder is 0, the position information is m.

The first designating unit 904 has a function of designating, from the transposed Bloom filter row tBF(p) and for each arrangement position indicated by the position information, a transposed Bloom filter corresponding to the position information converted by the converting unit 903. For example, the first designating unit 904 designates from the transposed Bloom filter row tBF(p), a transposed Bloom filter having an arrangement number that coincides with the position information obtained from the converting unit 903.

In the example depicted in FIG. 8, in the transposed Bloom filter row tBF(3) at the third level, since the remainders (position information) are "2", "19", and "27", the transposed Bloom filter tbf(3-2), tbf(3-19), and tbf(3-27) respectively having arrangement numbers of "2", "19", and "27" are designated.

The second designating unit 905 has a function of designating from the Bloom filter row BF(p), a Bloom filter(s) bf(p) that corresponds to position information common to plural transposed Bloom filters tbf(p) designated by the first designating unit 904. For example, the second designating unit 905 performs AND calculation with respect to the bit strings of the transposed Bloom filter tbf(p) designated by the first designating unit 904. The position of a bit having a value of "1" by this AND calculation indicates a Bloom filter having a bit that is believed to have been turned ON when an entry was added to the pre-transposition Bloom filter row BF(p).

In the example depicted in FIG. 8, at the third level, when AND calculation of the transposed Bloom filter tbf(3-2), tbf(3-19), and tbf(3-27) is performed, in the AND results, the head bit position has a value of "1". Therefore, it is known that a bit in the pre-transposition Bloom filter bf(3-1) of the Bloom filter row BF(3) may have been turned ON when entry of the search data was registered.

Thus, the number of times the transposed Bloom filter row tBF(p) is accessed by the first designating unit 904 and the second designating unit 905 can be reduced to a greater extent as compared to the pre-transposition Bloom filter row BF(p). Therefore, as compared to the pre-transposition Bloom filter row BF(p), the more the number of levels p of the transposed Bloom filter tbf(p) increases, the more the number of accesses are suppressed at each level, whereby increased search speed can be realized.

The judging unit 906 has a function of judging whether a Bloom filter row constituted by the Bloom filter designated by the second designating unit 905 is present. For example, the judging unit 906 may merely judge whether a transposed Bloom filter row is present 1 level below the transposed Bloom filter row tBF(p). More specifically, the judging unit 906 may merely check whether p equals 1.

If 1 level lower, a transposed Bloom filter row is present (p≠1) the first designating unit 904 newly designates the transposed Bloom filter row as the transposed Bloom filter row tBF(p). On the other hand, if a transposed Bloom filter row 1 level lower is not present (p=1), the transposed Bloom filter row tBF(p) is the transposed Bloom filter row tBF(1) at the first level, the lowest level.

The determining unit 907 has a function of determining whether the search data is present in the data block db# that corresponds to the Bloom filter bf(p) designated by the second designating unit 905 from among data block set db, if the judging unit 906 has judged that no Bloom filter row 1 level lower is present. If p equals 1, the Bloom filter bf(1) designated by the second designating unit 905 has a one-to-one correspondence with the data blocks and therefore, a data block db# having a block number coinciding with the position of a bit having a value of "1" consequent to the AND calculation result at the second designating unit 905 is identified. Since the identified data block db# may be a false positive, the determining unit 907 determines whether the data block db# results is positive or negative.

The hash table HT# of the identified data block db# is referenced and whether the result for the search data is a false positive/negative is determined. In this case, similar to the search processing using the hierarchal Bloom filter BF, the hash value obtained by a given hash function (for example, H1( )) of the search data is used as a key and it is determined from the hash table HT# whether the data (or the pointer thereof) is present. If the data is not present, an error caused by a false positive has occurred.

The extracting unit 908 has a function of extracting the search data from the identified data block db#, if the determining unit 907 has made a determination of positive. For example, since the storage position of the search data is clear from hash table HT# corresponding to the identified data block, the extracting unit 908 extracts the search data and data related thereto from the storage position.

For example, the search data itself may be extracted from the identified data block db#. If extraction is successful, the search data is clearly registered. Further, if the search data is a file number, file data related to the file number is extracted. If the search data is a dictionary guide word or a technical guide word, data explaining the guide word is extracted.

The output unit 909 extracts, for example, a determination result obtained by the determining unit 907 and data extracted by the extracting unit 908. For example, a determination result indicating positive or negative for the search data and extracted data in the case of positive are output. The form of output may be display at the display 108, audio output, printout, transmission to an external apparatus, etc.

Figure 10:
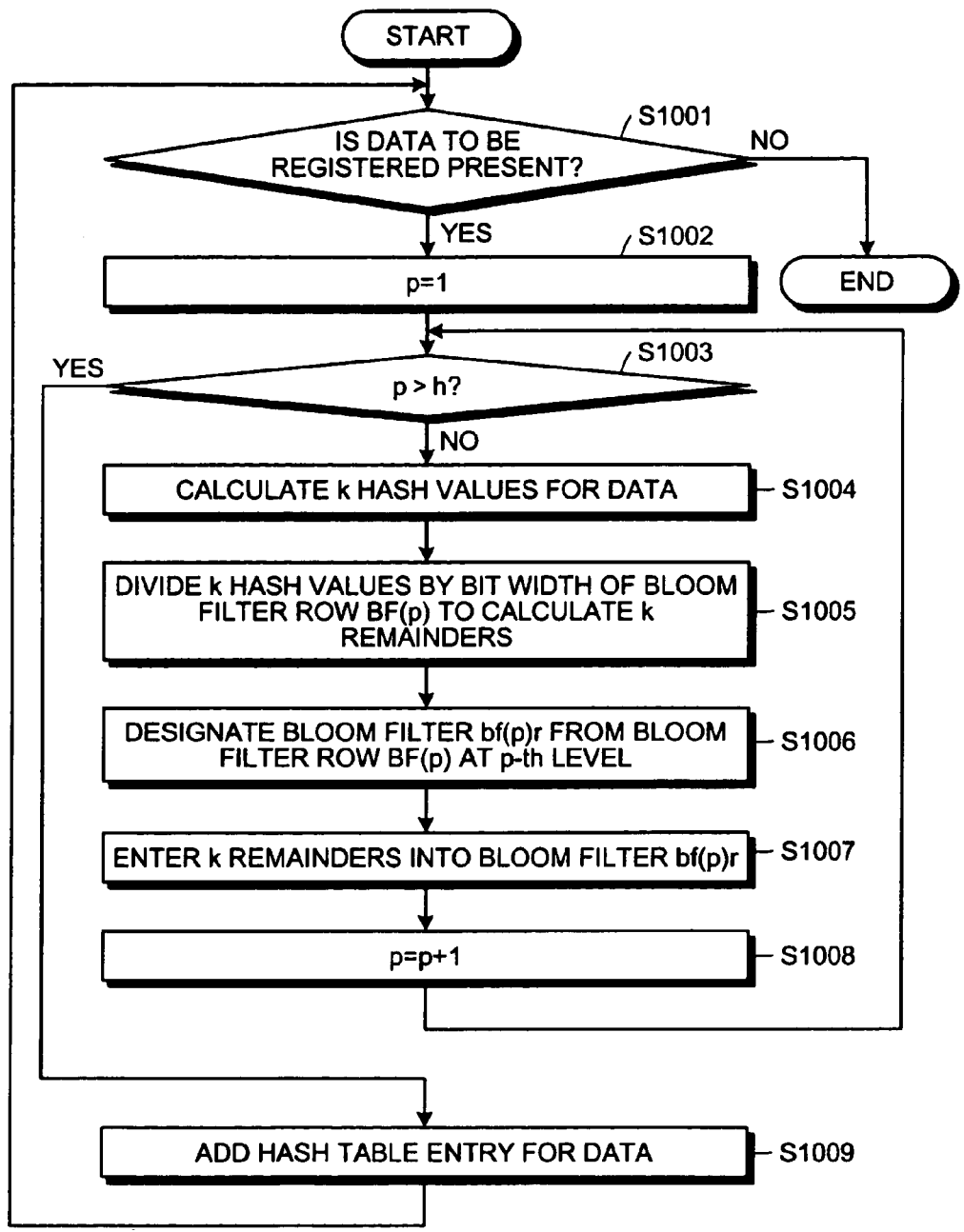
FIG. 10 is a flowchart of hierarchal Bloom filter learning processing by a registration processing unit.

FIG. 10 is a flowchart of hierarchal Bloom filter BF learning processing by the registration processing unit 201. The registration processing unit 201 judges whether data to be registered (data D) is present (step S1001). If present (step S1001: YES), the registration processing unit 201 sets the level number p to 1 (step S1002), and judges whether p>h is true (where, h is the highest level of the hierarchal Bloom filter BF) (step S1003). If p>h is not true (step S1003: NO), the registration processing unit 201 uses k types of hash functions and calculates k hash values for data D (step S1004), and divides the k hash values by the bit width of the Bloom filter row BF(p), to calculate k remainders (step S1005).

The registration processing unit 201, from the p-th Bloom filter row BF(p) designates a Bloom filter bf(p)r to which data D is to be registered (step S1006). If p=1, a Bloom filter bf(1-#) having a block number corresponding to that of the data block db# to which data D is to be stored is designated as the Bloom filter bf(p)r.

For example, as depicted in FIG. 5, if data D is to be registered in data block db3, the Bloom filter bf(1-3) at the first level and having an arrangement number that is identical to the block number "3" of the data block db3 is designated as the Bloom filter bf(p)r.

If p≠1, from the Bloom filter row BF(p) at p-th level, the Bloom filter bf(p) that corresponds to the bit position of the Bloom filter bf(p−1)r at the (p−1)-th level and designated for data D registration, is newly designated as the Bloom filter bf(p)r to which data D is to be registered.

For example, as depicted in FIG. 5, if P=2, from the Bloom filter row BF(2) at the second level, the Bloom filter bf(2-2) that includes the bit position of the Bloom filter bf(1-3), which is the Bloom filter bf(1)r designated for data D registration at the first level, is newly designated as the Bloom filter bf(2)r to which data D is to be registered.

The registration processing unit 201 enters the k remainders calculated at step S1005 into the Bloom filter bf(p)r to which data D is to be registered (step S1007). In other words, the registration processing unit 201 turns ON the bits at the bit positions coinciding with the values of the remainders. If the remainder is 0, the tail bit is turned ON. The number of levels p is incremented (step S1008), and the flow returns to step S1003.

At step S1003, if p>h is true (step S1003: YES), a hash table entry for data D is added (step S1009). For example, as depicted in FIG. 4, registration of the hash table entry E3 is added to the hash table HT3.

The flow returns to step S1001. At step S1001, if data D is not present (step S1001: NO), the hierarchal Bloom filter BF learning processing by the registration processing unit 201 ends. By such processing, the hierarchal Bloom filter BF is built.

Figure 11:
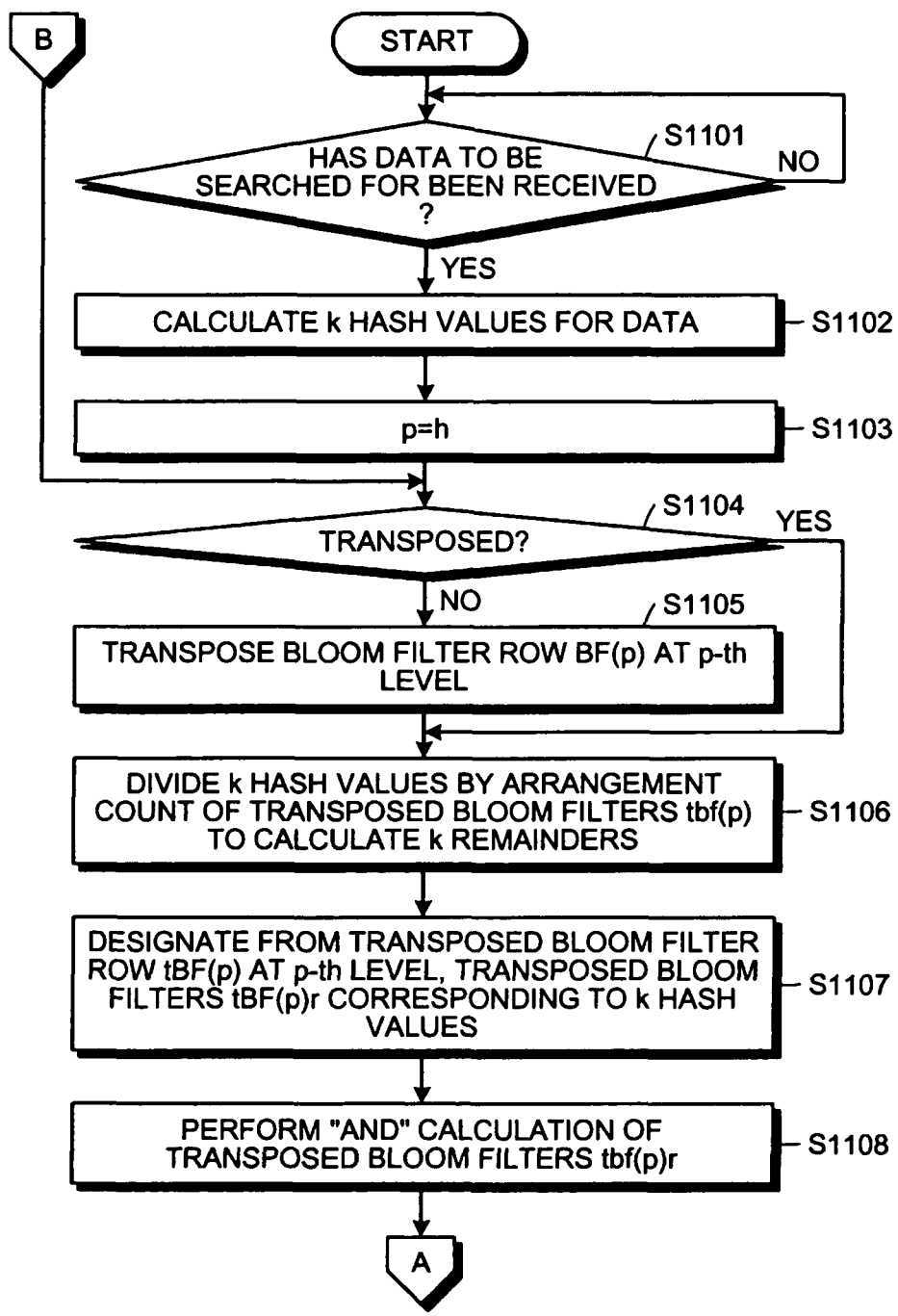
FIGS. 11 and 12 are flowcharts of search processing performed by the search processing unit.
Figure 12:
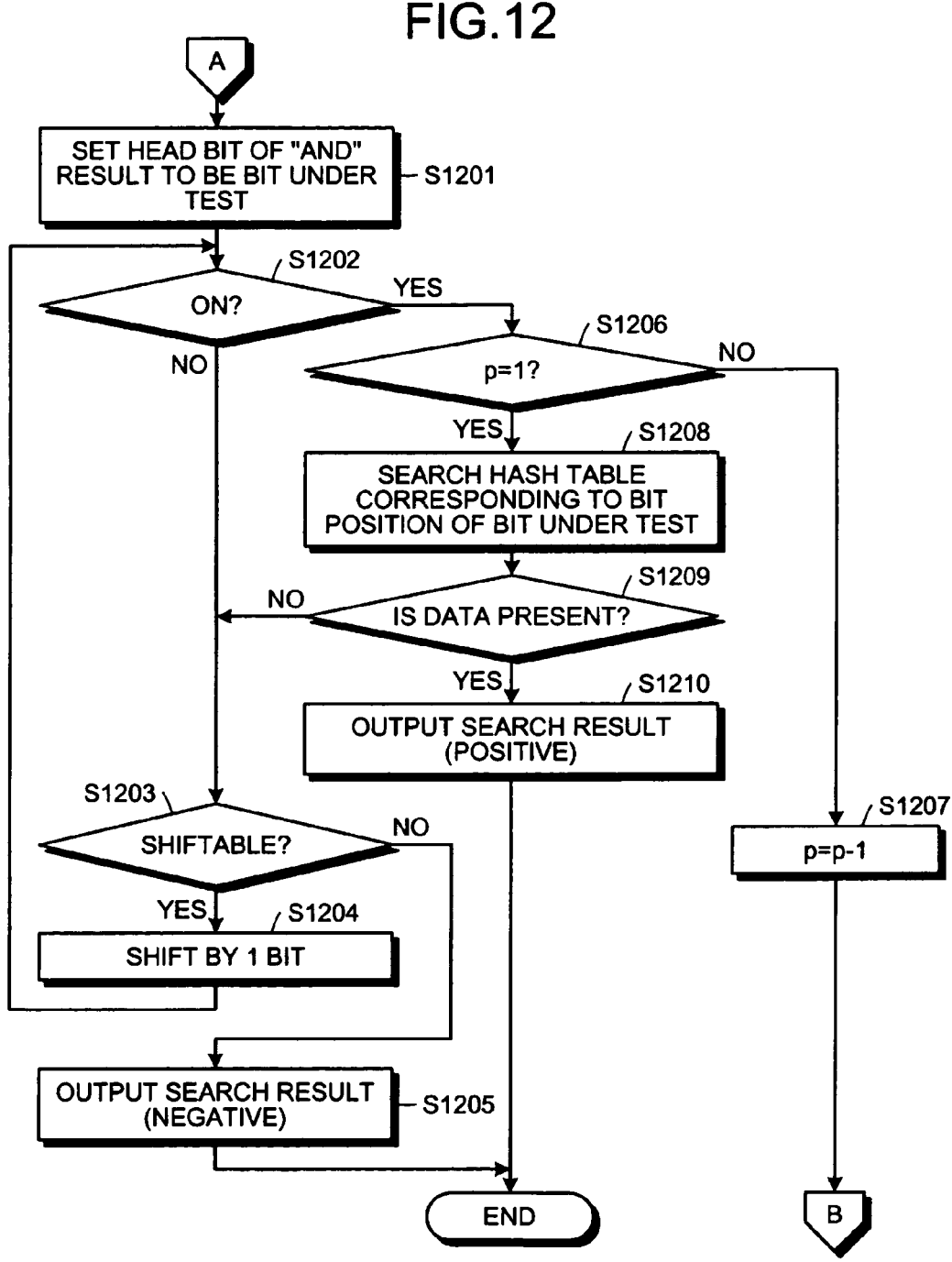

FIGS. 11 and 12 are flowcharts of search processing performed by the search processing unit 202. The Bloom filter used by the search processing unit 202 may be the hierarchal transposed Bloom filter tBF that has been preliminarily transposed or may be the hierarchal Bloom filter BF. If the hierarchal Bloom filter BF is used, each time a Bloom filter that has not been transposed is designated, transposition processing is performed.

In other words, as a search is performed, the hierarchal transposed Bloom filter tBF is built. In FIGS. 11 and 12, a procedure is described, where as a search is performed, the hierarchal transposed Bloom filter tBF is built. In a case where all transpositions have been completed, judgment of whether transposition has been completed (step S1104) and transposition processing (step S1105) may be omitted.

In FIG. 11, the search processing unit 202 remains in standby until data that is to be search for (data Dx) has been received by the receiving unit 901 (step S1101: NO). When data Dx has been received (step S1101: YES), the search processing unit 202, via the converting unit 903 provides data Dx to k types of hash functions and calculates k hash values (step S1102).

The search processing unit 202 sets p=h, i.e., sets the level number p to the maximum number of levels h (step S1103), and judges whether the Bloom filter row BF(p) at the p-th level has been transposed (step S1104). If the Bloom filter row BF(p) has been transposed (step S1104: YES), the flow proceeds to step S1106. On the other hand, if the Bloom filter row BF(p) has not been transposed (step S1104: NO), the search processing unit 202, via the transposing unit 902, transposes the Bloom filter row BF(p) at the p-th level (step S1105), and the flow proceeds to step S1106.

At step S1106, the search processing unit 202, via the converting unit 903, divides the k hash values by the arrangement count of the transposed Bloom filters to calculate k remainders (step S1106). The search processing unit 202, via the first designating unit 904, designates from the transposed Bloom filter row tBF(p) at the p-th level, k transposed Bloom filters tbf(p)r that correspond to the values of the k remainders (step S1107).

The search processing unit 202, via the second designating unit 905, performs AND calculation with respect to the k transposed Bloom filters tbf(p)r (step S1108), and the flow proceeds to step S1201 in FIG. 12.

As depicted in FIG. 12, the search processing unit 202, via the second designating unit 905, sets the head bit of the AND result to be the bit under test (step S1201), and judges whether the bit is ON (step S1202). If the bit is not ON, the search processing unit 202, via the determining unit 907, judges whether the bit is shiftable (step S1203). For example, the search processing unit 202 judges whether the bit is the tail bit.

If the bit is shiftable (step S1203: YES), the search processing unit 202 shifts the bit 1 bit in the direction the tail bit (step S1204), and the flow returns to step S1202. On the other hand, at step S1203, if the bit is not shiftable (step S1203: NO), the search processing unit 202, via the determining unit 907, makes the determination "search result (negative)", which is output from the output unit 909 (step S1205), whereby processing in a case where the search result is negative ends.

Meanwhile, at step S1202, if the bit under test is ON (step S1202: YES), the search processing unit 202, via the judging unit 906, judges whether the current level number p is 1 (step S1206). If p is not 1 (step S1206: NO), p is incremented (step S1207), and the flow returns to step S1104.

On the other hand, if p is 1 (step S1206: YES), the search processing unit 202, via the determining unit 907 searches the hash table that corresponds to the bit position of the bit under test (step S1208) and judges whether data Dx is present (step S1209).

If the bit is not present (step S1209: NO), the flow returns to step S1203, and the search processing unit 202 judges whether the bit is shiftable. On the other hand, if the bit is present (step S1209: YES), the search processing unit 202 outputs "search result (positive) (step S1210). The search processing unit 202, as necessary, extracts related data via the extracting unit 908 and outputs the extracted data as a search result, whereby processing in the case of the search result being positive ends.

As described, according to the present embodiment, the Bloom filter row BF(p) is transposed into the transposed Bloom filter row tBF(p), effecting reduced memory access and increased search speed. In particular, use of the hierarchal transposed Bloom filter tBF reduces memory access at each level, enabling even faster searching.

Further, by using notification of startup completion as a transposition request, upon startup of the management apparatus 200, the hierarchal Bloom filter BF is transposed into the hierarchal transposed Bloom filter tBF. Such collective transposition, at startup, into the hierarchal transposed Bloom filter tBF enables the hierarchal transposed Bloom filter tBF to be used at any time until shutdown.

By using a search request for the data block set db as a transposition request, in the hierarchal Bloom filter BF, the Bloom filter row BF(p) used by the search processing unit 202 is transposed upon a search request. Consequently, as search frequency increases and the transposed Bloom filter rows tBF(p) increase. Therefore, the hierarchal Bloom filter BF is gradually transposed from Bloom filter rows BF(p) needed for a search, whereby unnecessary transposition processing of Bloom filter rows that are not used can be reduced.

In the case of the hierarchal transposed Bloom filter tBF transposed from the hierarchal Bloom filter BF, until the lower level is reached, mere judgment of whether the AND result has a bit that is ON is performed to judge whether the result is false positive or negative. If the AND result has even 1 bit that is ON, the result is judged to be a false positive and processing transitions 1 level down. In this manner, by using the AND result, whether the result is negative can be easily determined, enabling the non-presence of the search data to be easily identified.

Figure 13:
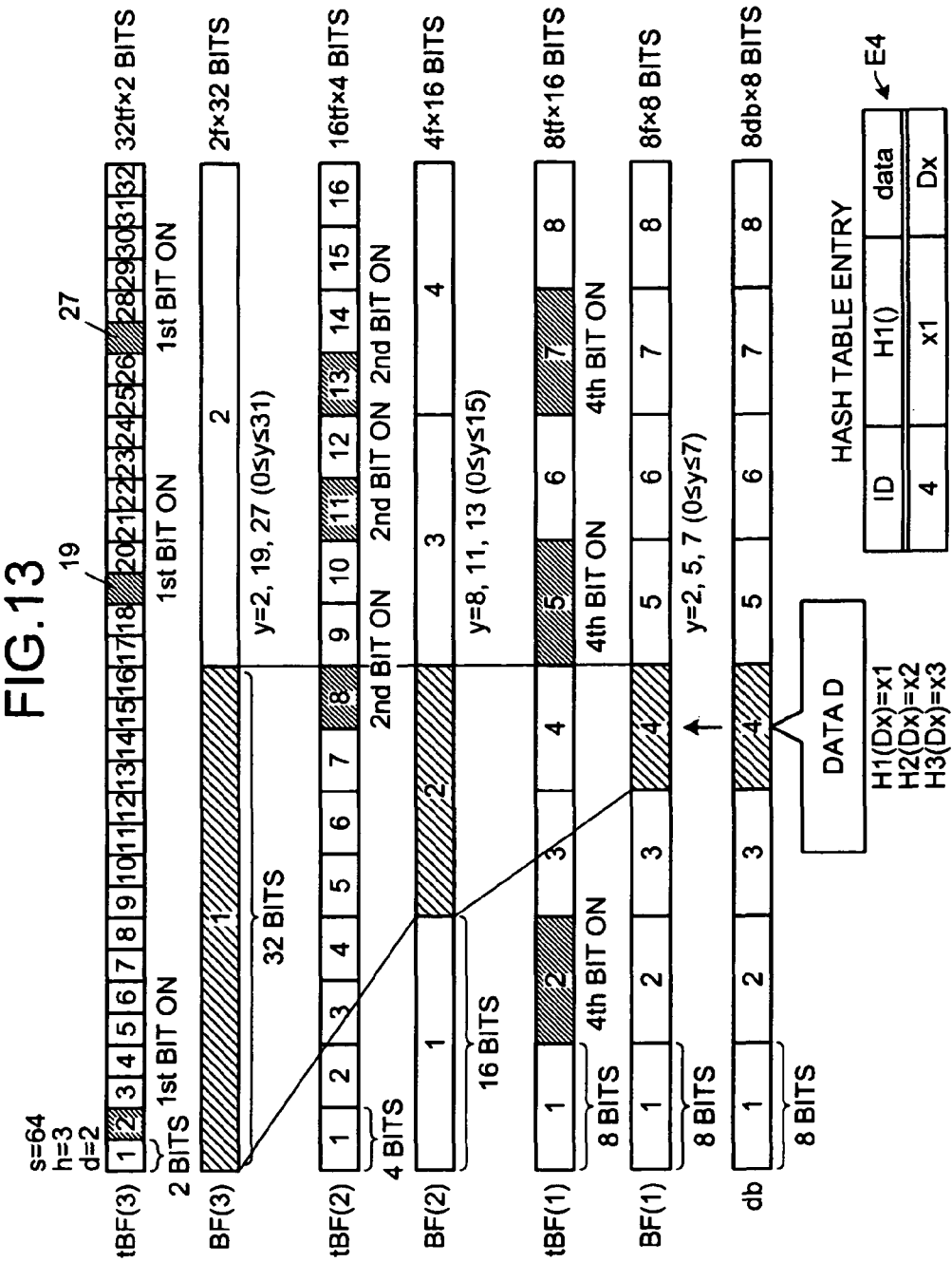
FIG. 13 depicts an example of hierarchal transposed Bloom filter tBF learning processing by the registration processing unit.

FIG. 13 depicts an example of hierarchal transposed Bloom filter tBF learning processing by the registration processing unit 201. In this example, the hierarchal transposed Bloom filter tBF depicted in FIG. 8 is used. In FIG. 8 an example was described where data Dx was searched for and hit; however, in FIG. 13, an example is described where the data that is searched for (data Dx) is data that has not yet been registered in the data block set db.

In this example, the number of types of hash functions to which data Dx, which is to be registered, is provided is k=3; and the hash functions used are hash functions H1( ), H2( ), and H3( ) where hash function H1( ) is to be registered to the hash table.

Further, in the data block set db, data Dx has been registered in the data block db4. Examples of the hash values obtained when data Dx is provided to each of the hash functions H1( ), H2( ), and H3( ) are as follows.

$H1(Dx)=x1$ $H2(Dx)=x2$ $H3(Dx)=x3$

In the hierarchal transposed Bloom filter tBF learning processing, a given bit in the transposed Bloom filter tbf(p) that is to be updated is turned ON, however, if the bit is already ON, the bit remains as is.

In this example, the registration processing unit 201 generates hash table entry E4 for hash table HT4, which corresponds to block number 4, the block number of the data block db4 to which data Dx is to be registered. The registration processing unit 201 adds/registers the generated hash table entry E4 to hash table HT4.

The processing transitions to learning processing at the first level. The registration processing unit 201 designates from the transposed Bloom filter row tBF(1) at the first level, a transposed Bloom filter(s) tbf(1) that is to be updated. For example, the registration processing unit 201 divides each of the hash values x1 to x3 by 8, the arrangement count for the transposed Bloom filter row tBF(1) at the first level, to calculate the remainders. In this example, the remainder for hash value x1 is "2", the remainder for hash value x2 is "5", the remainder for hash value x3 is "7". Therefore, the transposed Bloom filters tbf(1) that are to be updated and at the first level are the transposed Bloom filters tbf(1-2), tbf(1-5), and tbf(1-7).

In this example, at the lowest level, the bit position that corresponds to block number 4, the block number of the data block db4 to which data Dx is to be registered, is regarded as the bit to be updated. Therefore, the 4th bit from the head bit of the transposed Bloom filter is the bit to be updated and is turned ON, whereby learning processing of the transposed Bloom filter row tBF(1) at the first level ends.

The processing transitions to learning processing at the second level. The registration processing unit 201 designates from the transposed Bloom filter row tBF(2) at the second level, a transposed Bloom filter(s) tbf(2) that is to be updated. For example, the registration processing unit 201 divides each of the hash values x1 to x3 by 16, the arrangement count for the transposed Bloom filter row tBF(2) at the second level, to calculate the remainders. In this example, the remainder for hash value x1 is "8", the remainder for the hash value x2 is "11" and the remainder for the hash value x3 is "13". Therefore, the transposed Bloom filters tbf(2) that are to be updated and at the second level are the transposed Bloom filter tbf(2-8), tbf(2-11), and tbf(2-13).

Here, explanation will be given describing at which of the bit positions in the transposed Bloom filter tbf(2-8), tbf(2-11), tbf(2-13), the bits are to be turned ON. In the pre-transposition hierarchal Bloom filter BF, with d as the divider, each of the Bloom filter rows BF(p) were divided into n(=d[h−(p−1)]) segments, whereby the bit width of each of the Bloom filter rows BF(p) became m(=s/n) bits.

Consequently, in the hierarchal Bloom filter BF learning processing, the Bloom filter bf(p) that includes the bit position of the Bloom filter bf((p−1)-#) that is to be updated at the (p−1)-th level, is designated from the Bloom filter row BF(p) at the p-th level.

For example, in the example depicted in FIG. 5, at the second level, the arrangement number "3" of the Bloom filter bf(1-3) that was to be updated at the previous level (the first level) is divided by divider d(=2) and the result is rounded up to yield "2", the arrangement number for update. Therefore, the Bloom filter bf(2-2) is designated.

On the contrary, in the hierarchal transposed Bloom filter tBF, since the arrangement count n and the bit width m are interchanged, the bit position to be updated at the (p−1)-th level is divided by divider d, not the arrangement number # of the Bloom filter bf((p−1)-#) to be updated at the (p−1)-th level, and the result is rounded up.

In the case of the second level, the bit to be updated at the first level is the bit 4th from the head, where the 4th bits in the transposed Bloom filters tbf(1-2), tbf(1-5), and tbf(1-7) are ON and therefore, the bit updated at the second level is d=2, whereby the 4/d=2 bit from the head is regarded as the bit to be updated. In the present example, the 2nd bits from the heads of the transposed Bloom filters tbf(2-8), tbf(2-11), and tbf(2-13) are turned ON, whereby the transposed Bloom filter row tBF(2) learning processing at the second level ends.

The processing transitions to learning processing at the third level. The registration processing unit 201 designates from the transposed Bloom filter row tBF(3) at the third level, a transposed Bloom filter(s) tbf(3) that is to be updated. For example, the registration processing unit 201 divides each of the hash values x1 to x3 by 32, the arrangement count for the transposed Bloom filter row tBF(3) at the third level, to calculate the remainders. In this example, the remainder for hash value x1 is "2"; the remainder for hash value x2 is "19"; and the remainder for hash value x3 is "27". Therefore, the transposed Bloom filters tbf(3) to be updated at the third level are the transposed Bloom filters tbf(3-2), tbf(3-19), and tbf(3-27).

Next, bits that are to be updated and in the transposed Bloom filter tbf(3-2), tbf(3-19), and tbf(3-27) are determined. Similar to the second level, the bit position to be updated at the (p−1)-th level is divided by divider d, not the arrangement number # of the Bloom filter bf((p−1)-#) to be updated at the (p−1)-the level, and the result is rounded up.

In the case of the third level, the bit to be updated at the second level is the bit 2nd from the head, where the 2nd bits in the transposed Bloom filters tbf(2-8), tbf(2-11), and tbf(2-13) are ON and therefore, the bit updated at the third level is d=2, whereby the 2/d=1 bit from the head is regarded as the bit to be updated. In the present example, the head bits in the transposed Bloom filters tbf(3-2), tbf(3-19), tbf(3-27) are turned ON, whereby the transposed Bloom filter row tBF(3) learning processing at the third level ends.

Figure 14:
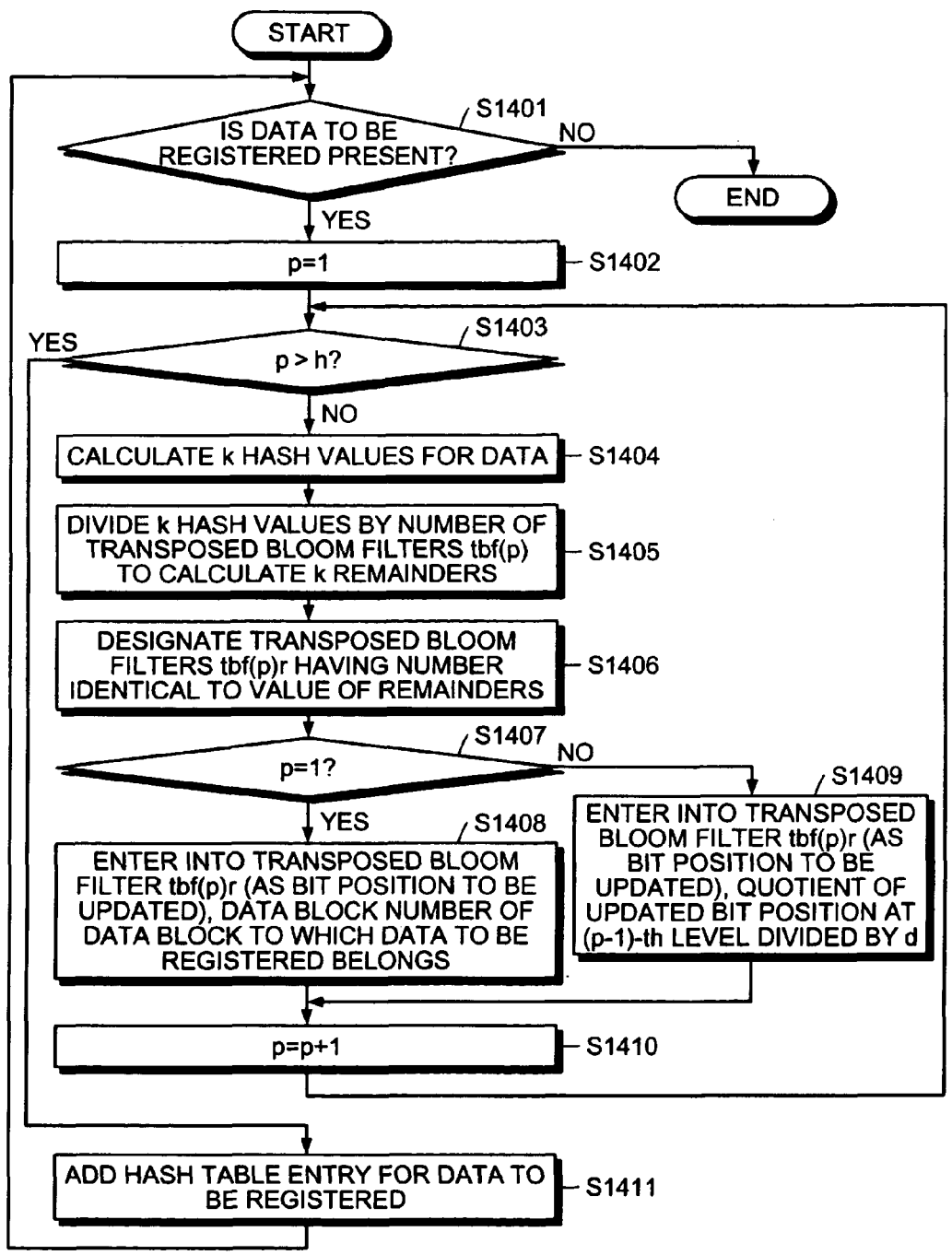
FIG. 14 is a flowchart of hierarchal Bloom filter BF learning processing by the registration processing unit.

FIG. 14 is a flowchart of hierarchal Bloom filter BF learning processing by the registration processing unit 201. The registration processing unit 201 judges whether data that is to be registered (data Dx) is present (step S1401). If data Dx is present (step S1401: YES), the registration processing unit 201 sets the level number p to 1 (step S1402) and judges whether p>h is true (where, h is the highest level of the hierarchal transposed Bloom filter tBF) (step S1403). If p>h is not true (step S1403: NO), the registration processing unit 201 uses k types of hash functions and calculates k hash values for data Dx (step S1404).

The registration processing unit 201 divides the k hash values by the arrangement count of the transposed Bloom filter tBF(p) at the p-th level, to calculate k remainders (step S1405). The registration processing unit 201 designates k transposed Bloom filters tbf(p)r having arrangement numbers identical to the k hash values (step S1406).

Subsequently, the registration processing unit 201 judges whether p=1 (step S1407). If p=1 is true (step S1407: YES), the registration processing unit 201 enters into the designated k transposed Bloom filters tbf(p)r, the block number # of the data block db# to which data Dx belongs (step S1408). In other words, the block number # of the data block db# to which data Dx belongs is set to be the bit position that is to be updated. In each of the designated k transposed Bloom filters tbf(p)r, the bit at the bit position that is to be updated is turned ON, and the flow proceeds to step S1410.

On the other hand, at step S1407, if p≠1 is true (step S1407: NO), the bit position of data Dx to be updated at the (p−1)-th level is divided by divider d and the resulting quotient (rounded up) is entered into the designated k transposed Bloom filter tbf(p)r (step S1409). In other words, the (rounded up) quotient of the bit position of data Dx to be updated at the (p−1)-th level divided by divider d is set to be the bit position that is to be updated. In each of the designated k transposed Bloom filters tbf(p)r, the bit at the bit position to be updated is turned ON and the flow proceeds to step S1410.

At step S1410, the registration processing unit 201 increments the level number p (step S1410), and the flow returns to step S1403. Thus, from the lowest level to the highest level, the bit to be updated can be turned ON.

On the other hand, at step S1403, if p>h is true (step S1403: YES), the registration processing unit 201 adds a hash table entry for data Dx (step S1411), and the flow returns to step S1401. Further, if data Dx is not present (step S1401: NO), the hierarchal transposed Bloom filter tBF learning processing by the registration processing unit 201 ends.

According to such processing, the registration processing unit 201 causes the hierarchal transposed Bloom filter tBF to learn of the data entry. In other words, even if data is registered after transposition, without having to return the hierarchal transposed Bloom filter tBF to the state of the hierarchal Bloom filter BF, the hierarchal transposed Bloom filter tBF (as is after transposition) can be caused to learn of the registration. Therefore, useless processing of returning hierarchal transposed Bloom filter tBF to the pre-transposition state is eliminated, improving search efficiency.

Re-transposition and storage of the transposed Bloom filter row tBF(p) will be described. Re-transposition and storage of the transposed Bloom filter row tBF(p) is performed by the storage/restoration processing unit 203 depicted in FIG. 2. The transposed Bloom filter row tBF(p) may be stored as is; however, with consideration of the time that elapses after startup of the management apparatus 200 until service begins, storage of the index information to a storage device is preferable. If the transposed Bloom filter row tBF(p) is stored as memory allocations, locality during updating is lost, making partial updating impossible.

In this example, locality is the gathering of given bit groups into 1 filter. Further, if a given bit group straddles multiple filters, locality is lost.

In other words, in each transposed Bloom filter tbf(p) in a transposed Bloom filter row tBF(p), arrangement count n and the bit width m are interchanged. Therefore, bit arrangement in the transposed Bloom filter tbf(p) becomes the arrangement of the pre-transposition Bloom filter bf(p); and the arrangement of the transposed Bloom filter tbf(p) becomes the bit arrangement in the pre-transposition Bloom filter bf(p). Consequently, each bit in the transposed Bloom filter tbf(p) straddles all of the pre-transposition Bloom filters bf(p), hindering partial updating.

To improve search speed by the transposed Bloom filter row tBF(p) and secure locality at the time of storage, each transposed Bloom filter tbf(p) in the transposed Bloom filter row tBF(p) is separated by a given word (a given bit width) and separated bit strings at the same word position are gathered. The word bit width w is determined by a divider c. For example, the bit width $n(n=d^{[h-(p-1)]})$ of the transposed Bloom filter tbf(p) is divided by divider c, yielding (w=n/c).

As a result, for each word position, a Bloom filter of divider c pre-transposition Bloom filters bf(p) is re-transposed. For example, if n=15 bits and assuming c=3 or c=5, in the case of c=3, the transposed Bloom filters tbf(p) are respectively divided into 3 segments. In the case of c=5, the transposed Bloom filters tbf(p) are respectively divided in 5 segments. The divider c is preliminarily set.

The divider c is a divisor of n (where, cases of c=1 and c=n are omitted). If c=1, division is not performed and therefore, this case is omitted. If c=n, the transposed Bloom filter tbf(p) is returned to the pre-transposition Bloom filter row BF(p). In this case, accesses equivalent in number to the total number of bits becomes necessary, which is time consuming in the re-transposition and storage processing and therefore, this case is omitted.

Figure 15:
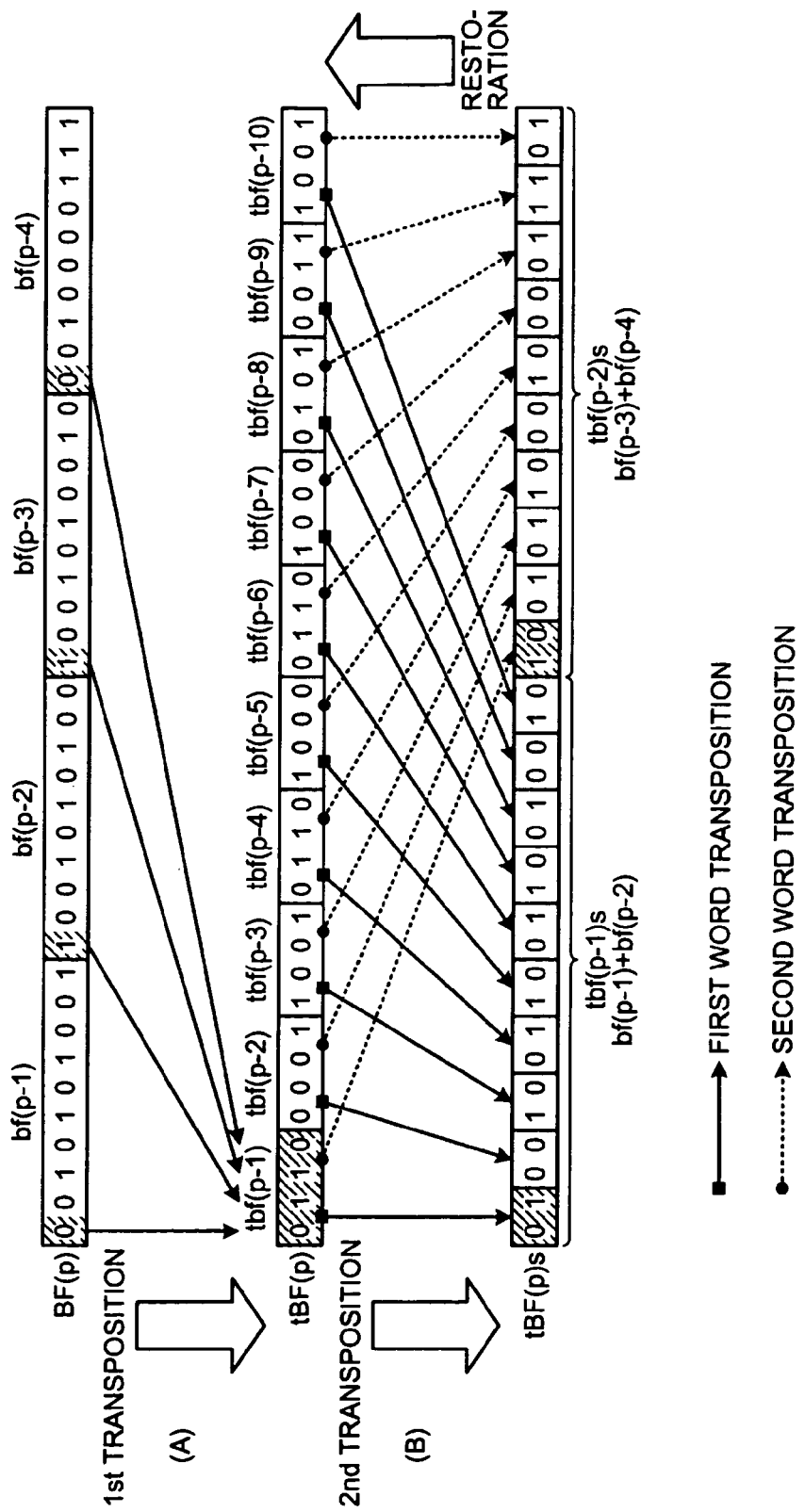
FIG. 15 depicts an example of re-transposition and storage of the transposed Bloom filter row tBF(p).

FIG. 15 depicts an example of re-transposition and storage of the transposed Bloom filter row tBF(p). In FIG. 15, an example is given using the Bloom filter row BF(p) and the transposed Bloom filter row tBF(p) depicted in FIG. 7. In the example depicted in FIG. 15, the bit width of the transposed Bloom filter tbf(p) n=4, the divider c=2, and the word bit width w=4/2=2.

In FIG. 15, (A) depicts the transposition example depicted in FIG. 7 (first transposition). The description of (A) is identical to that for FIG. 7 and is omitted herein. In FIG. 15, (B) depicts re-transposition (second transposition). Hereinafter, transposed Bloom filter row tBF(p) resulting from the first transposition will be referred to as "first transposed Bloom filter row tBF(p) and a transposed Bloom filter tbf(p) resulting from the first transposition will be referred to as "first transposed Bloom filter tbf(p). Further, the hierarchal transposed Bloom filter tBF constituted by the first transposed Bloom filter rows tBF(1) to tBF(h) at the first to the h-th levels will be referred to as "first hierarchal transposed Bloom filter tBF".

A Bloom filter row resulting from transposition of the first transposed Bloom filter row tBF(p) at the second transposition will be referred to as "second transposed Bloom filter row tBF(p)s"; and Bloom filters constituted by divider c second transposed Bloom filter rows tBF(p)s will be referred to as "second transposed Bloom filters tbf(p−1)s to tbf(p−c)s".

An arbitrary second transposed Bloom filter will be referred to as "tbf(p)s". Further, a hierarchal transposed Bloom filter constituted by the second transposed Bloom filter rows tBF(1)s to tBF(h)s at the first to the h-th levels will be referred to as "second hierarchal transposed Bloom filter tBFs".

In (B), since divider c=2, the second transposed Bloom filter row tBF(p)s is constituted by 2 transposed Bloom filters tbf(p−1)s, tbf(p−2)s.

At the second transposition, the first transposed Bloom filter tbf(p) is divided by the word bit width w into c segments. In the example depicted in (B), the first transposed Bloom filter tbf(p) has a bit width of 4 bits, and is divided into two 2-bit words. In the present example, the head word of the first transposed Bloom filter tbf(p) is regarded as a first word and the next word is regarded as a second word. The first word is a bit string including bit numbers 1 and 2; the second word is a bit string including bit numbers 3 and 4.

The first word of each of the first transposed Bloom filters tbf(p) are gathered in order of the arrangement of the first transposed Bloom filters tbf(p) and are regarded as a second transposed Bloom filter tbf(p−1)s.

Similarly, the second word of each of the first transposed Bloom filters tbf(p) are gathered in order of the arrangement of the first transposed Bloom filters tbf(p) and are regarded as a second transposed Bloom filter tbf(p−2)s. The second transposed Bloom filters tbf(p−1)s, tbf(p−2)s are arranged in order of word, effecting conversion to the second transposed Bloom filter row tBF(p)s.

By such transposition, since identical words are gathered to the second transposed Bloom filter tbf(p)s, the bit numbers indicating bit position become sequential. If bit positions are in proximity of each other, the data blocks bd# are as well.

Thus, since the second transposed Bloom filter tbf(p)s is a bit arrangement of several (divider c) adjacent Bloom filters bf(p), locality can be maintained.

Restoration from the second transposed Bloom filter row tBF(p)s to the first transposed Bloom filter row tBF(p) will be described. The second transposed Bloom filter row tBF(p)s are c second transposed Bloom filters tbf(p)s arranged following the order of arrangement of the first transposed Bloom filters tbf(p).

The second transposed Bloom filter tbf(p−1)s is index information of the bits at identical bit positions in the Bloom filters bf(p−1), bf(p−2) before the first transposition, arranged following the order of the arrangement of the Bloom filters bf(p−1), bf(p−2). Similarly, the second transposed Bloom filter tbf(p−2)s is index information of the bits at identical positions in the Bloom filters bf(p−3), bf(p−4) before the first transposition, arranged following the order of arrangement of the Bloom filters bf(p−3), bf(p−4).

In the example depicted in FIG. 15, since the second transposed Bloom filter tbf(p−1)s is the head filter, the second transposed Bloom filter tbf(p−1)s is a filter in which the bit string at the head divided position of the first transposed Bloom filters tbf(p−1) to tbf(p−10) are arranged following the order of the arrangement of the first transposed Bloom filters tbf(p−1) to tbf(p−10).

Therefore, if restoration is performed, a memory area of the bit width of the second transposed Bloom filter row tBF(p)s is established. Further, in this memory area, to restore the first transposed Bloom filters tbf(p−1) to tbf(p−10), an area is respectively set for the first transposed Bloom filters tbf(p−1) to tbf(p−10). The second transposed Bloom filter tbf(p)s is divided by the arrangement count of the first transposed Bloom filter tbf(p), into bits widths of the divider c.

Figure 16:
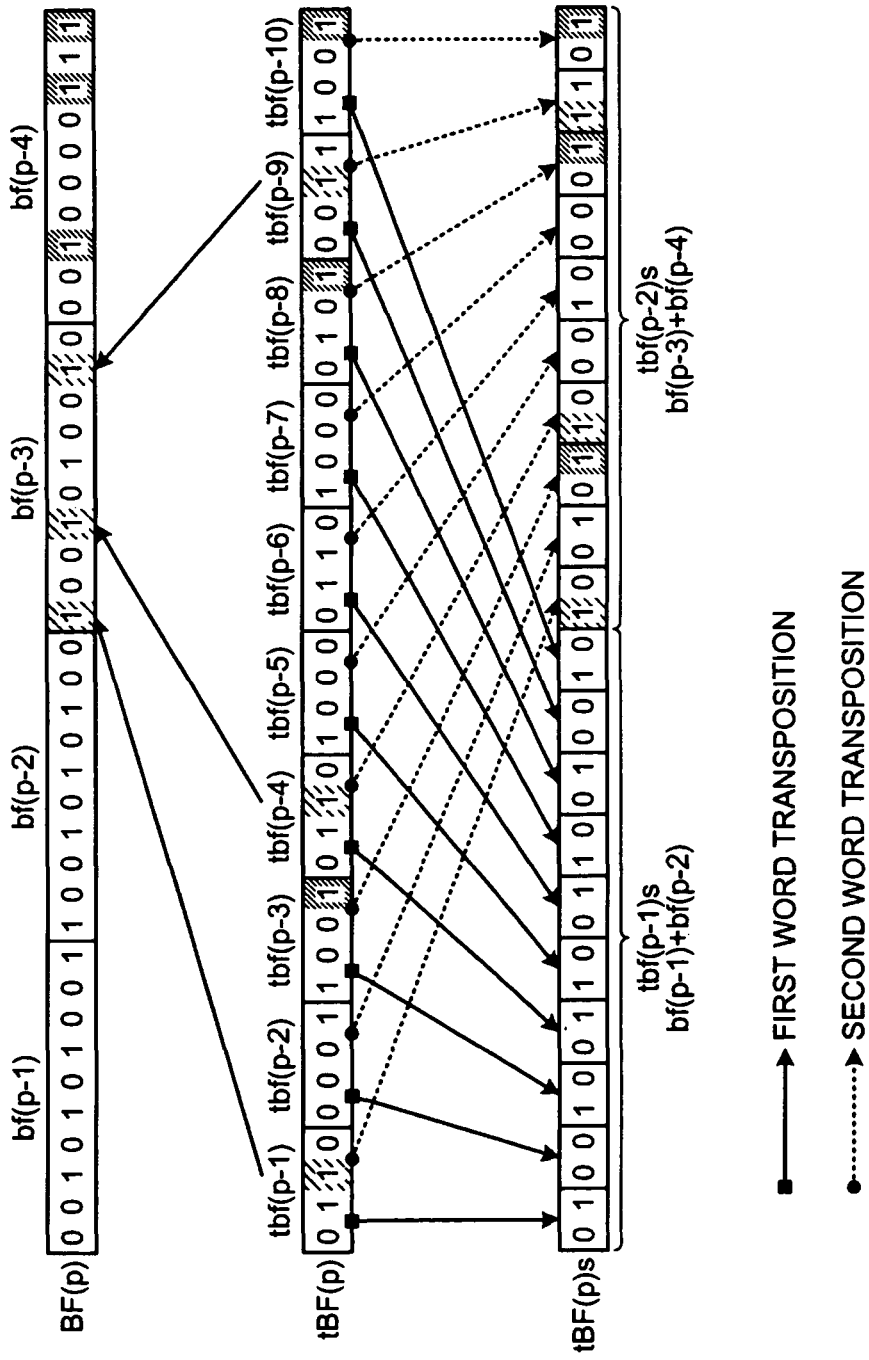
FIG. 16 depicts an example of updating of a second transposed Bloom filter row tBF(p)s.

In FIG. 16, for example, in the case of the second transposed Bloom filter row tBF(p−1)s, division by the word bit width w(=2) yields 10 divisions. The respective bit strings of the word bit width "2" are written to the areas respectively prepared for the first transposed Bloom filters tbf(p−1) to tbf(p−10). For example, the head word {01} of the second transposed Bloom filter tbf(p−1)s is written to the restoration area for the first transposed Bloom filter tbf(p−1).

The second word {00} of the second transposed Bloom filter tbf(p−1)s is written to the restoration area of the first transposed Bloom filter tbf(p−2). In this manner, writing is sequentially performed and the tenth word {10} of the second transposed Bloom filter tbf(p−1)s is written to the restoration area for the first transposed Bloom filter tbf(p−10). Writing is similarly performed for the second transposed Bloom filter tbf(p−2)s. In this case, writing continues from previously written bit strings, whereby arrangement order is maintained.

By performing such transposition, the second transposed Bloom filter row tBF(p)s is restored to the first transposed Bloom filter row tBF(p).

By performing restoration, the first transposed Bloom filter row tBF(p) is restored, whereby increased search speed can also be maintained. By executing the second transposition depicted in FIG. 15 for the transposed Bloom filter rows tBF(1) to tBF(h) at the first to the h-th levels, the first hierarchal transposed Bloom filter tBF is transposed into the second hierarchal transposed Bloom filter tBFs.

An example where data is newly registered in the data block set db and where registered data is updated will be described. If registered data has been updated (hereinafter, collectively "updated"). If data has been updated, as depicted in FIGS. 13 and 14, a portion of the first hierarchal transposed Bloom filter tBF is updated.

In the example depicted in FIG. 13, at the first level, the 4th bits of the first transposed Bloom filters tbf(1-2), tbf(1-5), and tbf(1-7) have been updated. At the second level, the second bits of the first transposed Bloom filters tbf(2-8), tbf(2-11), and tbf(2-13) have been updated. At the third level, the head bit of the first transposed Bloom filters tbf(3-2), tbf(3-19), and tbf(3-27) has been updated.

Thus, if the first transposed Bloom filter tbf(p) has been updated, at the p-th level thereof, the bit at the same bit position (for the first level, the fourth bits; for the second level, the second bits; and for the third level, the head bits) are updated. In this case, the first transposed Bloom filter row tBF(p) is transposed and the second transposed Bloom filter tbf(p)s that includes the bit that has been updated in the first transposed Bloom filter tbf(p) is updated, without generation of the second transposed Bloom filter tBF(p)s after the updating.

Therefore, transposition to the second hierarchal transposed Bloom filter tBFs need only be performed the first time, after which the second transposed Bloom filter tbf(p)s subject to updating is partially updated. By such partial updating, deterioration in the performance of the management apparatus 200 can be suppressed.

FIG. 16 depicts an example of updating of the second transposed Bloom filter row tBF(p)s. As depicted in FIG. 16, the first transposed Bloom filter row tBF(p) and the second transposed Bloom filter row tBF(p)s depicted in FIG. 15 are used in the present example.

When k types (here, k=3) of hash functions are used in learning processing depicted in FIGS. 13 and 14, k first transposed Bloom filters tBf(p) are designated in the first transposed Bloom filter row tBF(p). In FIG. 16, it is assumed that the first transposed Bloom filters tbf(p−1), tbf(p−4), and tbf(p−9) have been designated.

In the designated first transposed Bloom filters tbf(p−1), tbf(p−4), and tbf(p−9), the bits at identical bit positions have been updated and turned ON. As depicted in FIG. 16, in each of the first transposed Bloom filters tbf(p−1), tbf(p−4), and tbf(p−9), the third bit from the head is assumed to have been turned ON.

In viewing this update in terms of the Bloom filter row BF(p), the first, the fourth and the ninth bits from the head of the Bloom filter bf(p−3) at the third arrangement position have been updated, reflecting the same update.

If the first transposed Bloom filter row tBF(p) is updated, a second transposed Bloom filter tbf(p)s can be designated by the position of the updated bit. For example, a bit position table BT is referenced to designate a second transposed Bloom filter tbf(p)s that includes the updated bit position.

In the example depicted in FIG. 16, in each of the designated first transposed Bloom filters tbf(p−1), tbf(p−4), and tbf(p−9), the third bit from the head is ON. Therefore, the second transposed Bloom filter tbf(p−2)s, which includes the bit position "3", is designated.

Subsequently, different data is updated whereby the fourth bits of the first transposed Bloom filters tbf(p−3), tbf(p−8), and tbf(p−10) are assumed to have been designated. Similarly in this case, in each of the designated first transposed Bloom filters tbf(p−3), tbf(p−8), and tbf(p−10), the fourth bit from the head has been updated and turned ON. Therefore, the second transposed Bloom filter tbf(p−2)s, which includes the bit position "4", is designated.

In this manner, with the 2 data updates above, the third and the fourth bits in a portion of the first transposed Bloom filters tbf(p−1) to tbf(p−10) constituting the first transposed Bloom filter row tBF(p) are updated. Therefore, the second transposed Bloom filter tbf(p)s that is to be subject to updating is the second transposed Bloom filter tbf(p−2)s.

As result, the second transposed Bloom filter tbf(p−2)s is updated. On the other hand, since the second transposed Bloom filter tbf(p−1)s is not to be subject to updating this time, the second transposed Bloom filter tbf(p−1)s need not be updated. In this way, partial updating is performed only for filters that have been updated, whereby updating processing can be completed in less time.

An exemplary functional configuration of the storage/restoration processing unit 203 will be described.

Figure 17:
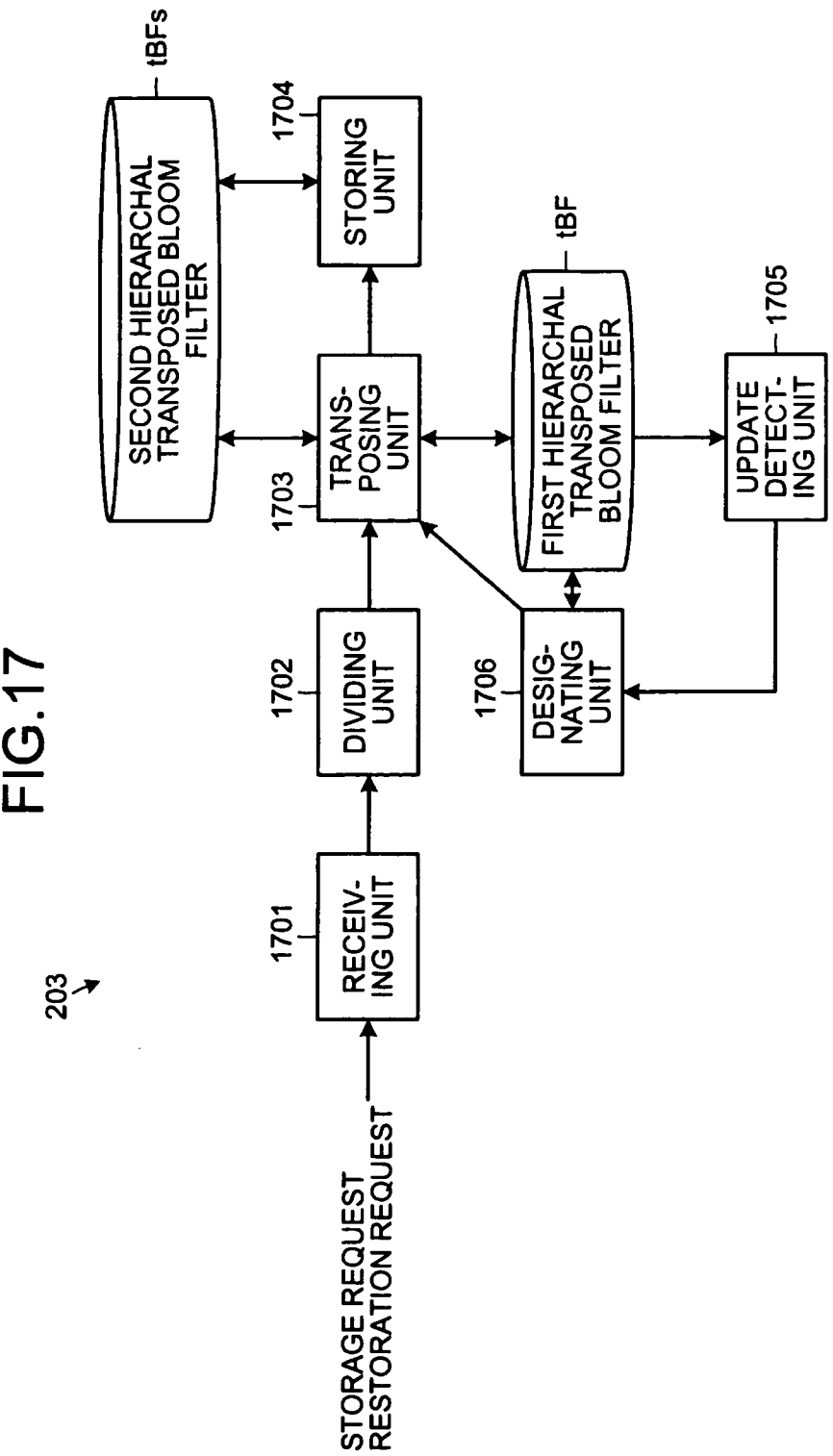
FIG. 17 is a block diagram of an exemplary functional configuration of a storage/restoration processing unit.

FIG. 17 is a block diagram of an exemplary functional configuration of the storage/restoration processing unit 203. As depicted in FIG. 17, the storage/restoration processing unit 203 includes a receiving unit 1701, a dividing unit 1702, a transposing unit 1703, a storing unit 1704, an update detecting unit 1705, and a designating unit 1706.

The receiving unit 1701 has a function of receiving a storage request or a restoration request concerning the first transposed Bloom filter row tBF(p). For example, a storage request or a restoration request is received via a user input operation. Further, shutdown of the management apparatus 200 may be regarded as a request for storage of the first transposed Bloom filter row and the completion of startup of the management apparatus 200 may be regarded as a request for restoration of the first transposed Bloom filter row tBF(p).

The dividing unit 1702 has a function of generating c words of n/c bits, by dividing the bit string of each of the first transposed Bloom filters tbf(p) by divider c (a divisor of n), if a storage request has been received by the receiving unit 1701. For example, in the example depicted in FIG. 15, since n=4 and c=2, the first transposed Bloom filter tbf(p) having bit width n=4 is divided into a first word constituted by a bit string that includes the bit at bit position 1 and at bit position 2, and a second word constituted by a bit string that includes the bit at bit position 3 and at bit position 4.

Since the dividing unit 1702 divides each of the first transposed Bloom filters tbf(p), the total word count is c×m (where, m is the arrangement count of the first transposed Bloom filter tbf(p)). In the example depicted in FIG. 15, m=10, whereby the total word count for the first transposed Bloom filter row tBF(p) is 20 words.

Further, the dividing unit 1702 generates m words of n/c bits, for each of the second transposed Bloom filters tbf(p)s by dividing the second transposed Bloom filter row tBF(p)s by divider c, if a restoration request is received. For instance, in the example depicted in FIG. 15, the second transposed Bloom filter tbf(p−1)s is divided by n/c=4/2=2-bit units, generating m=10 words. Similarly, the second transposed Bloom filter tbf(p−2)s is divided by n/c=4/2=2-bit units, generating m=10 words.

The transposing unit 1703 has a function of transposing the first hierarchal transposed Bloom filter tBF into the second hierarchal transposed Bloom filter tBFs. For example, if a storage request has been received, the transposing unit 1703 transposes the first hierarchal transposed Bloom filter tBF into the second hierarchal transposed Bloom filter tBFs. This transposition corresponds to the first transposition depicted in FIG. 15.

In this example, the transposing unit 1703, at the second transposition depicted in FIG. 15, arranges words at identical positions according to the arrangement order of the first transposed Bloom filters tbf(p), yielding the second transposed Bloom filter tbf(p)s. At the time of transposition, the transposition destination of each word is written to the bit position table. For instance, in the example depicted in FIG. 15, for first word, the second transposed Bloom filter tbf(p−1)s is written; for the second word, the second transposed Bloom filter tbf(p−2)s is written.

The first word of each of the first transposed Bloom filters tbf(p−1) to tbf(p−10) is arranged in the order of the first transposed Bloom filters tbf(p−1) to tbf(p−10), yielding the second transposed Bloom filter tbf(p−1).

Similarly, the second word in each of the first transposed Bloom filters tbf(p−1) to tbf(p−10) is arranged in the order of the first transposed Bloom filters tbf(p−1) to tbf(p−10), yielding the second transposed Bloom filter tbf(p−2)s.

Further, the transposing unit 1703 has a function of transposing the second hierarchal transposed Bloom filter tBFs into the first hierarchal transposed Bloom filter tBF. For example, if a restoration request is received, the transposing unit 1703 transposes the second hierarchal transposed Bloom filter tBFs stored in the storage device into the first hierarchal transposed Bloom filter tBF, whereby the first hierarchal transposed Bloom filter tBF is restored.

For example, the m words generated for each of the second transposed Bloom filters tbf(p)s by the dividing unit 1702 grouped according to arrangement position and arranged following the order of the arrangement of the second transposed Bloom filters tbf(p)s. In the example depicted in FIG. 15, for each of the second transposed Bloom filters tbf(p)s, 10 words are generated by the dividing unit 1702 and grouped according to arrangement position, i.e., the head words, the words at the second arrangement position, . . . , the words at the tail arrangement position (far right) are respectively grouped together. During this grouping, the groups are arranged in the order of the arrangement of the second transposed Bloom filters tbf(p)s, whereby the first transposed Bloom filter tbf(p) is restored.

The storing unit 1704 has a function of storing to the storage device, the second hierarchal transposed Bloom filter tBFs transposed by the transposing unit 1703. For example, as depicted in FIG. 15, the hierarchally arranged second hierarchal transposed Bloom filter rows tbf(p)s constituting the second hierarchal transposed Bloom filter tBFs are stored. Further, if an update is performed, the second transposed Bloom filters tbf(p)s are over written.

The update detecting unit 1705 has a function of detecting in a first transposed Bloom filter row tBF(p), the position of a bit that has been updated in an updated first transposed Bloom filter tbf(p). For example, as depicted in FIG. 16, if the third bits in the first transposed Bloom filter tbf(p−1), tbf(p−4), and tbf(p−9) have been updated, the bit position "3" is detected.

The designating unit 1706 designates from the first transposed Bloom filter row tBF(p), a group of words that are at the same arrangement position as the word that includes the updated bit position detected by the update detecting unit 1705. For instance, in the example depicted in FIG. 16, the bit numbers corresponding to the first word are "1", "2"; and the bit numbers corresponding to the second word are "3", "4". Therefore, the second word is designated as the word that includes the updated bit position.

Consequently, the transposing unit 1703 groups all of the second words from the first transposed Bloom filter row tBF (p) and arranges the second words in the order of the arrangement of the first transposed Bloom filters tbf(p), whereby the updated second transposed Bloom filter tbf(p)s is generated. Subsequently, the updated second transposed Bloom filter tbf(p)s is stored by the storing unit 1704.

Figure 18:
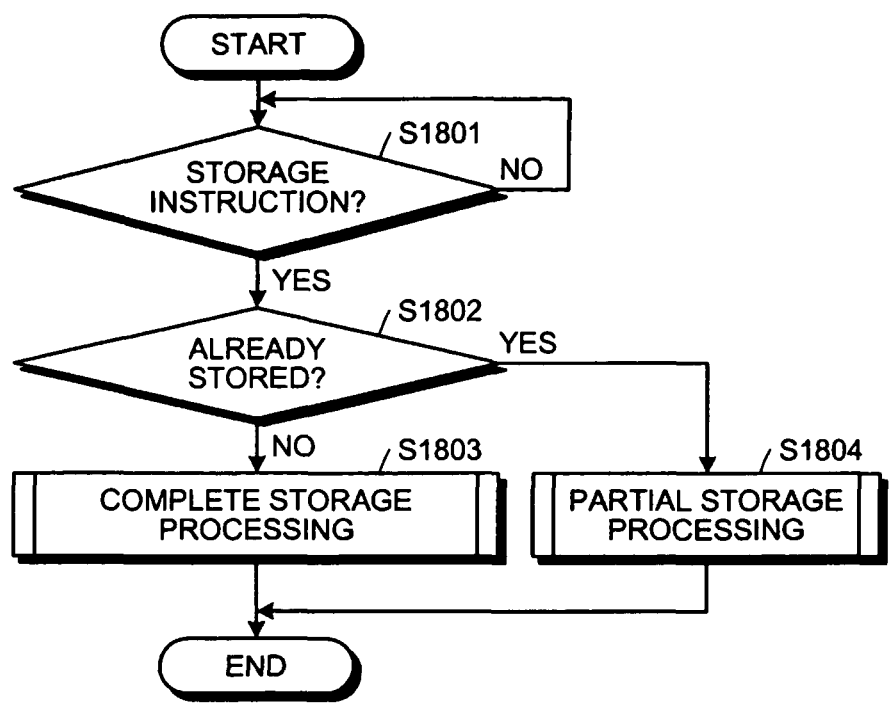
FIG. 18 is a flowchart of first hierarchal transposed Bloom filter tBF storage processing by the storage/restoration processing unit.

FIG. 18 is a flowchart of first hierarchal transposed Bloom filter tBF storage processing by the storage/restoration processing unit 203.

The storage/restoration processing unit 203 remains in standby until a storage request is received by the receiving unit 1701 (step S1801: NO). When a storage request is received (step S1801: YES), the storage/restoration processing unit 203 determines whether storage has already been performed (step S1802). If storage has not yet been performed (step S1802: NO), initial storage is to be performed and thus, the storage/restoration processing unit 203 executes complete storage processing for the first hierarchal transposed Bloom filter tBF (step S1803). Complete storage processing is processing of performing collective storage of all of the first transposed Bloom filter rows tBF(p) constituting the first hierarchal transposed Bloom filter tBF. Consequently, the first hierarchal transposed Bloom filter tBF storage processing by the storage/restoration processing unit 203 ends.

On the other hand, at step S1802, if storage has already been performed (step S1802: YES), the storage/restoration processing unit 203 executes partial storage processing (step S1804). Partial storage processing is processing of overwriting the second transposed Bloom filter tbf(p)s subject to updating in the saved second hierarchal transposed Bloom filter tBFs, whereby the first hierarchal transposed Bloom filter tBF storage processing by the storage/restoration processing unit 203 ends.

Figure 19:
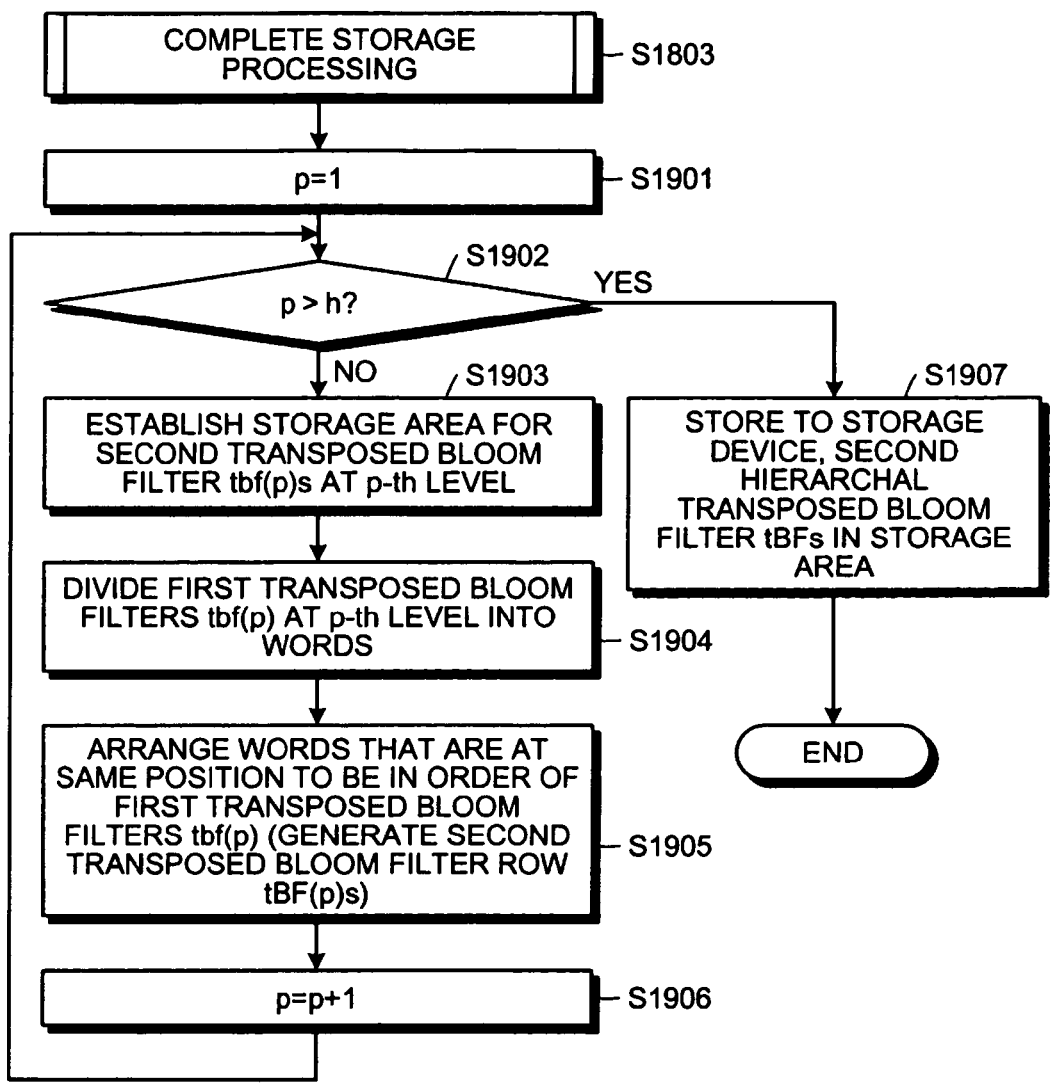
FIG. 19 is a flowchart of complete storage processing depicted in FIG. 18 (step S1803).

FIG. 19 is a flowchart of the complete storage processing depicted in FIG. 18 (step S1803). The storage/restoration processing unit 203 sets the level number p to 1 (step S1901), and judges whether level number p>h is true (where, h is the highest level) (step S1902).

If p>h is not true (step S1902: NO), the storage/restoration processing unit 203 establishes a storage area for the second transposed Bloom filter tbf(p)s at the p-the level (step S1903). For example, since the bit width of the second transposed Bloom filter row tBF(p) at the p-th level s(=n×m) and the divider c are known, c storage areas of bit width s/c are established.

The storage/restoration processing unit 203, via the dividing unit 1702, divides each of the first transposed Bloom filters tbf(p) at the p-th level into c words (step S1904). The storage/restoration processing unit 203 groups the words according to position after the division of the first transposed Bloom filter tbf(p), and with respect to each word group, arranges (in the storage areas) the words in the group to be in the order of the arrangement of the first transposed Bloom filters tbf(p) (step S1905), whereby the second transposed Bloom filter row tBF(p)s is generated.

The level number p is incremented (step S1906), and the flow returns to step S1902. Thus, the second transposed Bloom filters tBf(p)s at the first to the h-th levels can be generated.

Further, at step S1902, if p>h is true (step S1902: YES), the storage/restoration processing unit 203 the second hierarchal transposed Bloom filter tBFs in the storage area is stored to a storage device (step S1907), whereby the complete storage processing (step S1803) ends.

Figure 20:
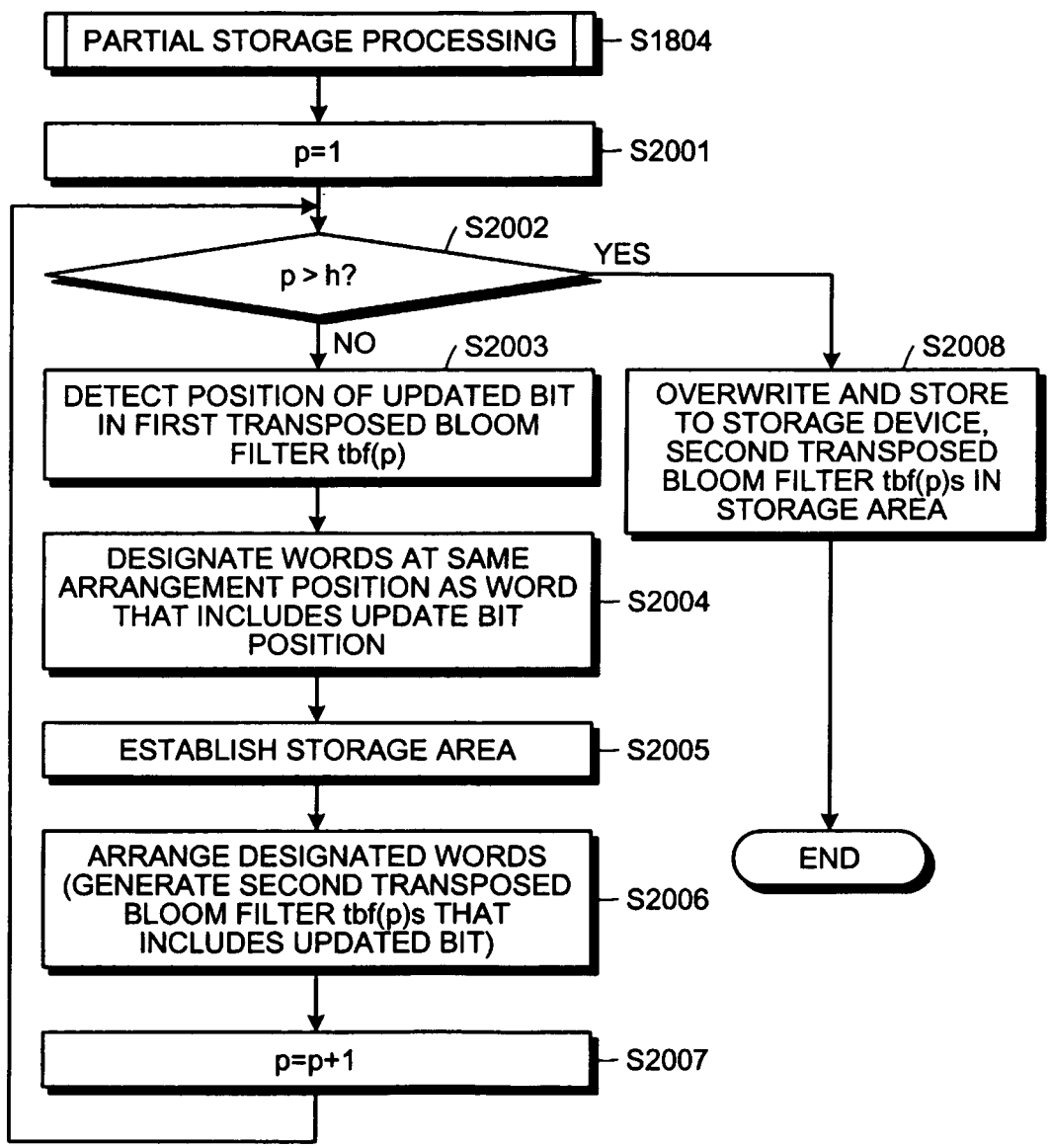
FIG. 20 is a flowchart of partial storage processing depicted in FIG. 18 (step S1804).

FIG. 20 is a flowchart of the partial storage processing depicted in FIG. 18 (step S1804). The storage/restoration processing unit 203 sets the level number p to 1 (step S2001) and judges whether p>h is true (where, h is the highest level) (step S2002).

If p>h is not true (step S2002: NO), the storage/restoration processing unit 203 detects, in the first transposed Bloom filter tbf(p), the position of the bit updated by the update detecting unit 1705 (step S2003).

The designating unit 1706 designates from first transposed Bloom filter tbf(p), words that are at the same arrangement position as the word that includes the updated bit position (step S2004). The storage area is established (step S2005). In this case, a bit width of the number of second transposed Bloom filters tbf(p)s to which the word that includes the updated bit position belongs is established. For example, the word bit width is w=n/c and since the arrangement count of the first transposed Bloom filter tbf(p) is m, a bit width of (n/c)×m=s/c is established.

The transposing unit 1703 arranges in the storage area, the group of words designated at the same arrangement position and thereby generates a second transposed Bloom filter tbf(p)s that includes the updated bit (step S2006). Subsequently, the level number p is incremented (step S2007), and the flow returns to step S2002. Thus, updating from the first level to the h-th level can be performed.

At step S2002, if p>h is not true (step S2002: YES), the storage/restoration processing unit 203 overwrites the second transposed Bloom filter tbf(p)s in the storage area to the storage device (step S2008). In other words, the pre-updating second transposed Bloom filter tbf(p)s in the storage device is overwritten and saved, ending the partial storage processing (step S1804).

Figure 21:
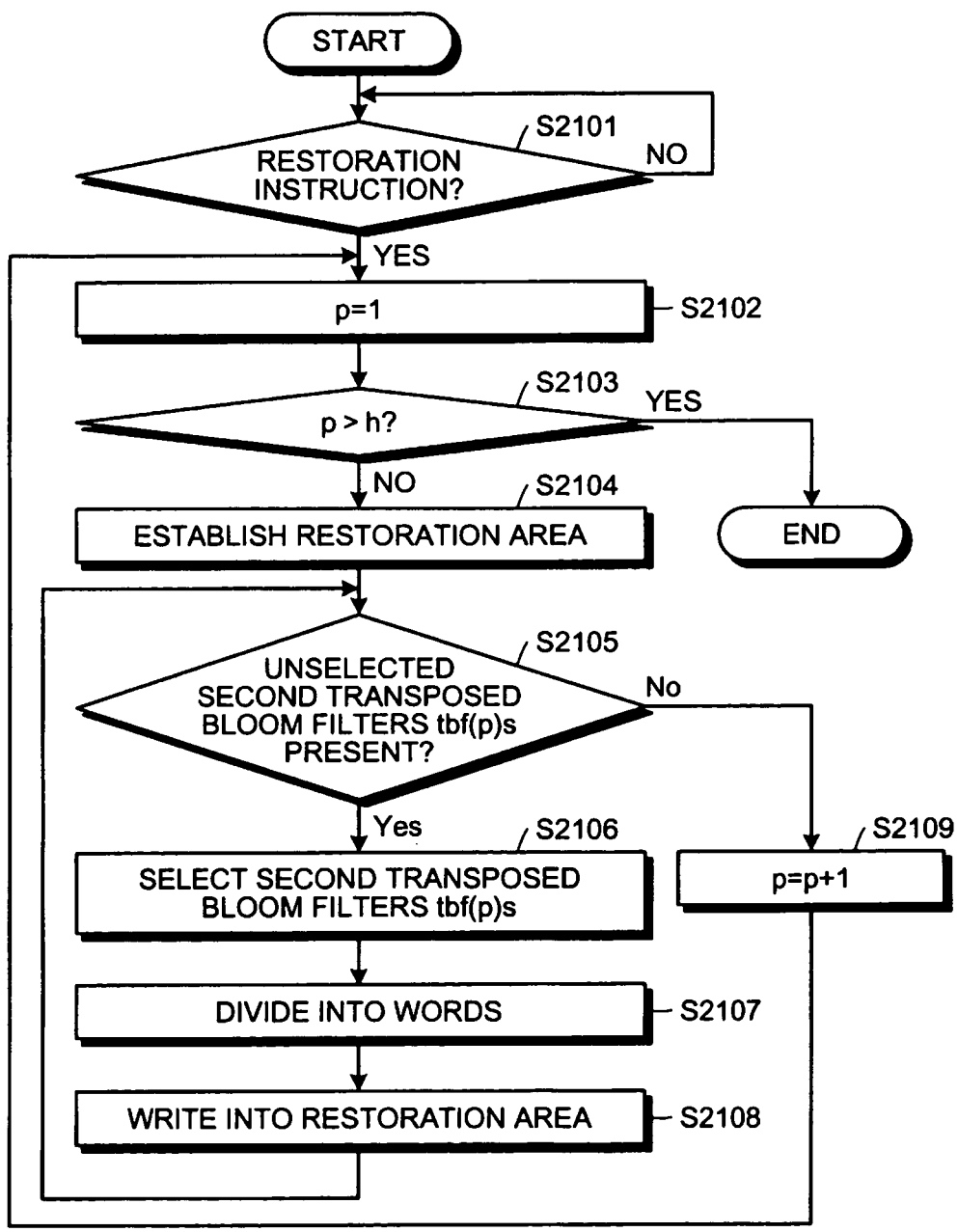
FIG. 21 is a flowchart of restoration processing by the storage/restoration processing unit.

FIG. 21 is a flowchart of the restoration processing by the storage/restoration processing unit 203. The storage/restoration processing unit 203 remains in standby until a restoration instruction is received by the receiving unit 1701 (step S2101: NO). When a restoration instruction is received (step S2101: YES), the storage/restoration processing unit 203 sets the level number p to 1 (step S2102), and judges whether p>h is true (where, h is the highest level) (step S2103).

If p>h is not true (step S2103: NO), the storage/restoration processing unit 203 establishes a restoration area (step S2104). A restoration area has the bit width of first transposed Bloom filter row tBF(p) and is separated according to first transposed Bloom filters tbf(p).

The storage/restoration processing unit 203 judges whether any second transposed Bloom filters tbf(p)s that have not yet been selected remain (step S2105). If a second transposed Bloom filter tbf(p)s that has not been selected is present (step S2105: YES), the storage/restoration processing unit 203 selects the second transposed Bloom filter tbf(p)s from the head arrangement position (step S2106). In the example depicted in FIG. 15, selection is in the order of the second transposed Bloom filters tbf(p−1)s, tbf(p)s.

The storage/restoration processing unit 203, via the dividing unit 1702, divides the selected second transposed Bloom filter tbf(p)s into words (step S2107). Next, the storage/restoration processing unit 203, via the transposing unit 1703, writes into the restoration area for each of the first transposed Bloom filters tbf(p) (step S2108), and the flow returns to step S2105.

At step S210, if no unselected second transposed Bloom filter tbf(p)s remains (step S2105: NO), the storage/restoration processing unit 203 increments the level number p (step S2109), and the flow returns to step S2102. Thus, restoration from the first to the h-th level can be performed. Further, at step S2103, if p>h true (step S2103: YES), the restoration processing ends.

In this manner, according to the present embodiment, transposition and storage is performed in units of words, whereby the number of memory accesses can be reduced. In other words, if the first transposed Bloom filter row tBF(p) is restored to the Bloom filter row BF(p), transposition in units of bits has to be performed, which increases the number of memory accesses and consumes time; however, in the present embodiment, increased storage processing speed can be realized.

By grouping according to word, adjacent first transposed Bloom filter rows tBF(p) are grouped and stored. Therefore, if updating is performed in neighboring data blocks, the first transposed Bloom filter tbf(p) that includes the updated bit can be updated alone in the first transposed Bloom filter row tBF(p). In this manner, with transposing and storing the entire first hierarchal transposed Bloom filter tBF, the updated portion alone can be partially transposed and restored, enabling increased storage processing efficiency.

An example of restoration when plural second transposed Bloom filter rows tBF(p)s are stored will be described. If the data registrations to the data block set db is a given number or more, Bloom filter search performance diminishes. Therefore, if the number of data registration reaches or exceeds a given number, the hierarchal Bloom filter BF for the service is newly set.

For this newly set hierarchal Bloom filter BF as well, the transposition above is performed, yielding the first hierarchal transposed Bloom filter tBF. Here, to distinguish the new first hierarchal transposed Bloom filter tBF from an existing registered first hierarchal transposed Bloom filter tBF, the former will be referred to as a "first hierarchal transposed Bloom filter tBFa".

The transposed Bloom filter row at the p-th level and constituting the first hierarchal transposed Bloom filter tBFa will be referred to as a "first transposed Bloom filter row tBFa(p)"; and a transposed Bloom filter constituting the first transposed Bloom filter row tBFa(p) will be referred to as a "first transposed Bloom filter tbfa(p)".

When a first hierarchal transposed Bloom filter tBFa is generated, the number of the first hierarchal transposed Bloom filters becomes 2. If data D is to be search for, the first hierarchal transposed Bloom filter tBF is used and a search is performed. Subsequently, the first hierarchal transposed Bloom filter tBFa is used and a search is performed.

When the first hierarchal transposed Bloom filters tBF, tBFa are stored, after the "second transposition" is performed for each and the results are stored to the storage device. Thus, the first hierarchal transposed Bloom filter tBF is stored as the second hierarchal transposed Bloom filter tBFs. Meanwhile, the data structure of the first hierarchal transposed Bloom filter tBFa also has a data structure is also identical to the first hierarchal transposed Bloom filter tBF and is therefore, stored in the same manner.

Here, the second hierarchal transposed Bloom filter for the first hierarchal transposed Bloom filter tBFa will be referred to as a "second hierarchal transposed Bloom filter tBFas". Further, transposed Bloom filter row at the p-th level constituting the second hierarchal transposed Bloom filter tBFas will be referred to as "second transposed Bloom filter row tBFa(p)s"; and a transposed Bloom filter constituting the second transposed Bloom filter row tBFa(p)s will be referred to as a "second transposed Bloom filter tbfa(p)s".

Figure 22:
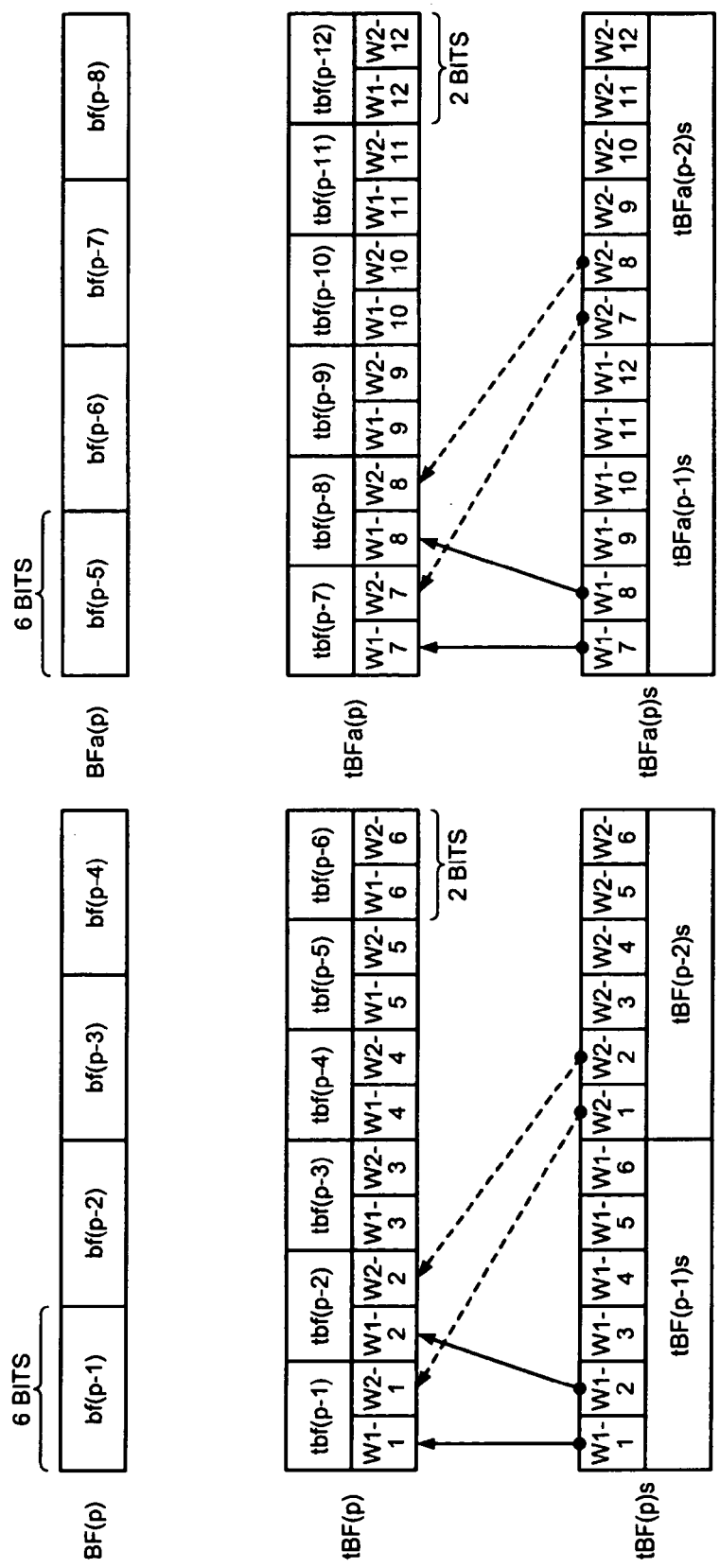
FIG. 22 depicts an example in which plural second transposed Bloom filter rows tBF(p)s are stored.

FIG. 22 depicts an example in which plural second transposed Bloom filter rows tBF(p)s are stored.

In FIG. 22, the left side depicts an existing Bloom filter BF(p), an existing first transposed Bloom filter tBF(p), and an existing second transposed Bloom filter tBF(p)s. The right side depicts a newly added Bloom filter BFa(p), a newly added first transposed Bloom filter tBFa(p), and a newly added second transposed Bloom filter tBFa(p)s. The Bloom filter BFa(p) is the Bloom filter row that is transposed at the first transposition to yield the first transposed Bloom filter tBFa(p).

In FIG. 22, for example, the bit width of the Bloom filter rows BF(p), BFa(p)s is assumed to be 24 bits. Further, the arrangement count n of the Bloom filters constituting each of the Bloom filter rows BF(p), BFa(p) is 4 and the bit width of the Bloom filters bf(p-1) to bf(p-8) m is 6.

Further, the divider c is assumed to be 2. Therefore, in the first transposed Bloom filter tBF(p),tBFa(p), c(=2) words having a bit width of n/c(=4/2=2) are generated. The word at the head position among the generated words, is referred to as word W1-# and the word at the next position is referred to as word W2-#.

For example, word W1-1 is the head word of the first transposed Bloom filter tbf(p-1); word W2-1 is the word subsequent to word W1-1 in the first transposed Bloom filter tbf(p-1).

Similarly, word W1-7 is the head word of the first transposed Bloom filter tbfa(p-7); word W2-7 is the word subsequent to word W1-7 in the first transposed Bloom filter tbfa(p-7).

As depicted in FIG. 22, through the storage processing by the storage/restoration processing unit 203, the first transposed Bloom filter rows tBF(p), tBFa(p) are respectively transposed into the second transposed Bloom filter rows tBF(p)s, tBFa(p)s and stored to the storage device.

Further, through the restoration processing by the storage/restoration processing unit 203, the second transposed Bloom filter rows tBF(p)s, tBFa(p)s are respectively transposed into the first transposed Bloom filter rows tBF(p), tBFa(p) and restored from the storage device.

In this manner, in the example depicted in FIG. 22, since the first transposed Bloom filter rows tBF(p), tBFa(p) exist independently, when a data search is performed, the search processing unit 202 first uses the first transposed Bloom filter row tBF(p) to execute a search and then uses the first transposed Bloom filter row tBFa(p) to execute a search.

In the example depicted in FIG. 22, when a search is performed, the 2 Bloom filters (the first transposed Bloom filter rows tBF(p), tBFa(p)) are used independently, however, if the number of registered data is of a large amount, the quantity of Bloom filters is also great, reducing search efficiency. Therefore in the following example, when the first transposed Bloom filter rows tBF(p), tBFa(p) are stored from a state of being independently stored, integration into the first transposed Bloom filter row tBF(p) is performed, whereby search efficiency is improved.

When the integrated first transposed Bloom filter row tBF(p) is stored, the integrated first transposed Bloom filter row tBF(p) becomes the second transposed Bloom filter row tBF(p)s by the second transposition. Thus, each time a Bloom filter is added, integration of the transposed Bloom filter is performed, and the first transposed Bloom filter row tBF(p) expands.

If a search is performed with respect to the first transposed Bloom filter row tBF(p) after integration, although the bit width becomes twice that of each of the transposed Bloom filter row tBF(p) before integration, by searching at each level, the narrowing down becomes two-fold.

For example, before integration, assuming data is hit in the first transposed Bloom filter row tBFa(p) without any hits in the first transposed Bloom filter row tBF(p), the search using the first transposed Bloom filter row tBF(p) is useless, consuming time until a hit occurs.

On the other hand, after integration, since a narrowing down to the first transposed Bloom filter row tBF(p) alone is possible, compared to the state before integration, the amount of useless searches can be reduced, enabling improved search efficiency.

Figure 23:
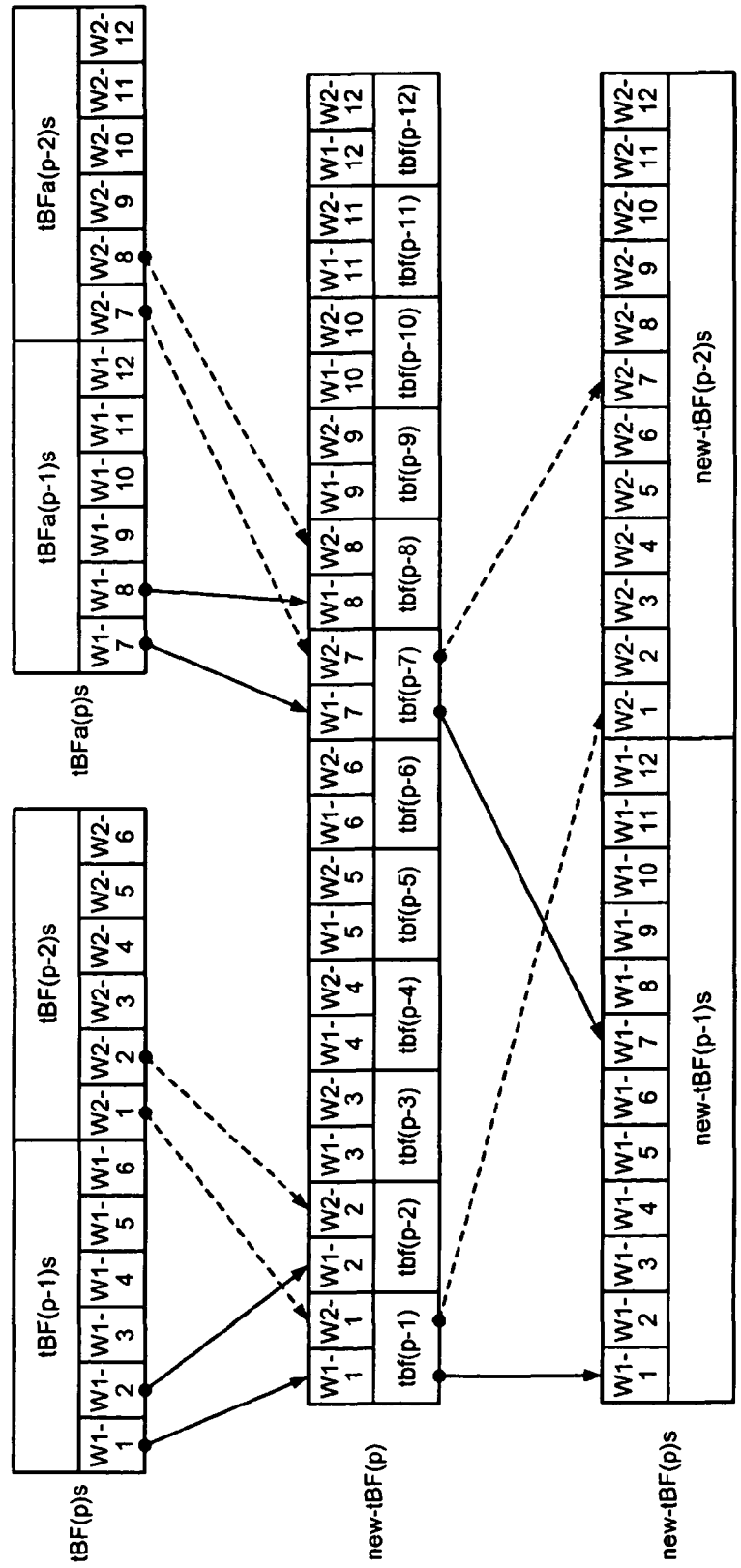
FIG. 23 depicts an example of integration and restoration of the second transposed Bloom filter rows tBF(p)s, tBFa(p)s.

FIG. 23 depicts an example of integration and restoration of the second transposed Bloom filter rows tBF(p)s, tBFa(p)s. In FIG. 23, the second transposed Bloom filter rows tBF(p)s, tBFa(p)s are divided into words W1-1 to W1-12, and words W2-1 to W2-12.

The words W1-1 to W1-12, W2-1 to W2-12 are grouped according to arrangement position. For example, words having the same # as words W1-# and W2-# are arranged in the order of word arrangement. For example, word W1-1 and word 2-1 both have "1" at the tail and are therefore arranged in the order of word W1-1, W2-1.

As a result, the original first transposed Bloom filter tbf(p−1) is restored. The other words are integrated into the first transposed Bloom filter row tBF(p) by similar transposition. The first transposed Bloom filter row tBF(p) after integration will be referred to as a "first transposed Bloom filter row new-tBF(p)".

In the integration of the present example, since 2 filters (the second transposed Bloom filter rows tBF(p)s, tBFa(p)s) are integrated, the bit width of the first transposed Bloom filter row new-tBF(p) is s×2=n×m×2=48 bits. If j is the number of filters to be integrated, the bit width after integration may expressed as n×m×j bits.

The first transposed Bloom filter row new-tBF(p) has the same data structure as the first transposed Bloom filter row tBF(p) before integration with the exception of bit width, filter number, and bit value. Therefore, the first transposed Bloom filter row tBF(p) can be similarly transposed and stored. A second transposed Bloom filter row tBF(p)s transposed from the first transposed Bloom filter row new-tBF(p) is referred to as a second transposed Bloom filter row new-tBF(p)s".

The second transposed Bloom filter row new-tBF(p)s is formed by an arrangement of the second transposed Bloom filters new-tBF(p−1)s, new-tBF(p−2)s. The second transposed Bloom filter new-tBF(p−1)s is formed by an arrangement of words W1-1 to W1-12.

In other words, the second transposed Bloom filter new-tBF(p−1)s is a transposed Bloom filter that is an integration of the second transposed Bloom filters tBF(p−1)s, tBFa(p−1)s. Similarly, the second transposed Bloom filter new-tBF(p−2)s is formed by an arrangement of words W2-1 to W2-12. In other words, the second transposed Bloom filter new-tBF(p−2)s is a transposed Bloom filter that is an integration of the second transposed Bloom filters tBF(p−2)s, tBFa(p−2)s.

FIG. 24 is a flowchart of integration/restoration processing by the storage/restoration processing unit 203. As depicted in FIG. 24, the storage/restoration processing unit 203 remains in standby until a restoration instruction is received by the receiving unit 1701 (step S2401: NO). When a restoration instruction is received (step S2401: YES), the storage/restoration processing unit 203 detects the number of second hierarchal transposed Bloom filters tBFs stored (stored number j) (step S2402).

In the example depicted in FIG. 23, since the second transposed Bloom filter rows tBF(p)s, tBFa(p)s are stored, the stored number j is 2.

The storage/restoration processing unit 203 sets the level number p to 1 (step S2403), and establishes for the p-th level, j restoration areas in the memory area of the management apparatus 200 (step S2404). The storage/restoration processing unit 203 judges whether there is a second transposed Bloom filter row tBF(p)s that has yet to be selected among the j second transposed Bloom filter rows tBF(p)s (step S2405).

If an unselected second transposed Bloom filter row tBF(p)s is present (step S2405: YES), the storage/restoration processing unit 203 selects a second transposed Bloom filter row tBF(p)s (step S2406). If an unselected second transposed Bloom filter row tBF(p)s is not present (step S2405: NO), the flow proceeds to step S2409.

In the example depicted in FIG. 23, j=2 and the second transposed Bloom filter rows tBF(p)s, tBFa(p)s are present. If the second transposed Bloom filter rows tBF(p)s, tBFa(p)s are both unselected, the storage/restoration processing unit 203 first selects the second transposed Bloom filter row tBF(p)s. Thereafter, if the flow proceeds to step S2405, the storage/restoration processing unit 203 selects the second transposed Bloom filter row tBFa(p)s and the next time the flow proceeds to step S2405, no unselected second transposed Bloom filter row tBF(p)s is present.

After the unselected second transposed Bloom filter row tBF(p)s is selected, the storage/restoration processing unit 203, via the dividing unit 1702, divides the selected second transposed Bloom filter row tBF(p)s into words (step S2407).

In the example depicted in FIG. 23, if the second transposed Bloom filter row tBF(p)s is selected, the storage/restoration processing unit 203 divides the second transposed Bloom filter tBF(p)s into words W1-1 to W1-6 and words W2-1 to W2-6. If the second transposed Bloom filter tBFa(p)s is selected, the storage/restoration processing unit 203 divides the second transposed Bloom filter tBFa(p)s into words W1-7 to W1-12 and words W2-7 to W2-12.

Via the transposing unit 1703, the storage/restoration processing unit 203 arranges the words according to arrangement position and writes the results to the restoration area (step S2408).

In the example depicted in FIG. 23, the storage/restoration processing unit 203 groups words W1-1 to W1-6, W2-1 to W2-6 arrangement position, i.e., words having the same tail number are grouped together. In other words, {W1-1,W2-1}, {W1-2,W2-2}, . . . , {W1-6,W2-6} are grouped and written.

Similarly, the storage/restoration processing unit 203 groups words W1-7 to W1-12, W2-7 to W2-12 according to arrangement position, i.e., words having the same tail number are grouped together. In other words, {W1-7,W2-7}, {W1-8,W2-8}, . . . , {W1-12,W2-12} are grouped and written.

Subsequently, the flow returns to step S2405. At step S2405, if no second transposed Bloom filter row tBF(p) are present (step S2405: NO), the storage/restoration processing unit 203 increments the level number p (step S2409), and judges whether p>h is true (step S2410). If p>h is not true (step S2410: NO), the flow returns to step S2404. On the other hand, if p>h is true (step S2410: YES), the integration/restoration processing by the storage/restoration processing unit 203 ends.

In this manner, according to the present embodiment, storage and restoration are repeated, whereby the even if plural second hierarchal transposed Bloom filters tBFs are stored (e.g., the second hierarchal transposed Bloom filters tBFs, tBFas), storage is limited to 1 memory block, an optimal data structure for searches. Thus, by expanding the second transposed Bloom filters tBFs, data indexing is possible as long as memory is available.

Consequently, the repetition of storage and restoration afford optimization, suppressing degradation of search time. In other words, without using a large memory area from the beginning, in the beginning the memory area is small, and as the number of registered data increases, the scale increases.

In the description above, once integration and restoration are performed, during the next storage processing, a single hierarchal transposed Bloom filter tBFs was stored, however, in the storage processing, as in a state before integration, the divided state may be stored. In this case, the first transposed Bloom filter row new-tBF(p) after integration is divided by the divider c, whereby the second transposition is performed for each of the first transposed Bloom filter rows tBF(p) and each are stored to the storage device as the second transposed Bloom filter row tBF(p)s.

Thus, even if division and storage are performed, if reintegration is performed, restoration to the first transposed Bloom filter row new-tBF(p) is possible. Furthermore, partial storage enables parallel execution of the storage processing for each of the first transposed Bloom filter rows tBF(p), facilitating a reduction in the storage time.

The search method described in the present embodiment may be implemented by executing a prepared program on a computer such as a personal computer and a workstation. The program is stored on a computer-readable, non-transitory medium such as a hard disk, a flexible disk, a CD-ROM, an MO, and a DVD, read out from the recording medium, and executed by the computer. The program may be a transmission medium that can be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory medium storing therein a search program, the search program executing a process comprising:

causing a computer to have access to a data block set that includes data groups respectively registered in data blocks, and a hierarchal Bloom filter configured in accordance with a memory area of h-levels by s-bits (h-levels x s-bits), where a bit-length s of each level of the hierarchal Bloom filter is divided based on a divider d of a highest level, being an h-th level, and a Bloom Filter is a segment resulting from division based on the divider and segments at each level constitute a Bloom filter row, where n Bloom filters, included in a Bloom filter row, each have m bits indicating a negativity result in a given number of the data blocks;

receiving a transposition request for the Bloom filter row;

transposing the Bloom filter row into a transposed Bloom filter row of m transposed Bloom filters respectively of n bits gathered from Bloom filters according to an arrangement position in Bloom filters and storing the transposed Bloom filter row to a storage device where strings of bits gathered according to position are arranged in an order of bit position, when a transposition request has been received;

converting, based on a plurality of hash functions, search data into position information indicating the arrangement position in the transposed Bloom filter, the search data being converted for each of the hash functions;

designating from the transposed Bloom filter row and for each arrangement position indicated by the position information, a transposed Bloom filter that corresponds to the indicated arrangement position;

designating from the Bloom filter row, a Bloom filter that corresponds to the position information common to the designated transposed Bloom filter; and judging whether a Bloom filter row constituted by the designated Bloom filter is present, wherein when a Bloom filter row constituted by the designated Bloom filter is not present, the judging includes judging whether the search data is present in a data block that is among the data block set and corresponds to the designated Bloom filter.

2. The computer-readable, non-transitory medium according to claim 1, wherein the receiving includes receiving, as the transposition request, notification of startup completion of the computer.

3. The computer-readable, non-transitory medium according to claim 1, wherein the receiving includes receiving, as the transposition request, a search request concerning the data block set.

4. The computer-readable, non-transitory medium according to claim 1, wherein the designating, when a Bloom filter row constituted by the designated Bloom filter is present, includes regarding the Bloom filter row as a designated Bloom filter row and regarding a Bloom filter row transposed from the designated Bloom filter row as a designated transposed Bloom filter row, from which and for each arrangement position indicated by the position information, a second designated transposed Bloom filter is designated that corresponds to the indicated arrangement position, and the designating includes designating from the designated Bloom filter row, a Bloom filter that corresponds to the position information common to the second designated transposed Bloom filters.

5. The computer-readable, non-transitory medium according to claim 1, the process further comprising:

receiving a storage request for the transposed Bloom filter row, which is regarded as a first transposed Bloom filter row of m first transposed Bloom filters;

dividing the bits of each of the first transposed Bloom filters by a divider c, which is a divisor of n, to generate c×m words of n/c bits, if a storage request is received at the receiving; and gathering the c×m words according to arrangement position in the first transposed Bloom filters to yield a second transposed Bloom filter row of c second transposed Bloom filters that each have $\{(n/c) \times m\}$ bits and storing the second transposed Bloom filter row to the storage device.

6. The computer-readable, non-transitory medium according to claim 5, the process further comprising:

detecting from the first transposed Bloom filter row, an arrangement position of a bit that has been updated in a first transposed Bloom filter;

designating from the first transposed Bloom filter row, a group of words that are at the same arrangement position as a word that includes the detected arrangement position, wherein the gathering includes gathering the word that includes the detected arrangement position and the designated words to yield a second transposed Bloom filter and storing the second transposed Bloom filter by overwriting.

7. The computer-readable, non-transitory medium according to claim 5, wherein the divider c is a divisor, excluding c=1 and c=n.

8. The computer-readable, non-transitory medium according to claim 5, wherein the receiving includes receiving a restoration instruction for restoration of the first transposed Bloom filter row, the dividing includes dividing the bits of the second transposed Bloom filter row by the divider c to generate for each of the second transposed Bloom filters, m words of n/c bits, the gathering includes gathering the m words into groups according to arrangement position and arranging the groups in an order following arrangement of the second transposed Bloom filters to transpose the second transposed Bloom filter row into the first transposed Bloom filter row.

9. The computer-readable, non-transitory medium according to claim 1, the process further comprising:

receiving a storage request for j of the transposed Bloom filter rows, which are regarded as j first transposed Bloom filter rows;

dividing the bit strings in each of the first transposed Bloom filters by a divider c, which is a divisor of n, to generate (c×m×j) words of n/c bits, when a storage request is received at the receiving;

gathering the words in each of the first transposed Bloom filter rows and according to arrangement position in each of the first transposed Bloom filters, to yield a second transposed Bloom filter row of c second transposed Bloom filters of $\{(n/c) \times m\}$ bits and storing to the storage device, the j second transposed Bloom filter rows;

receiving a restoration instruction instructing restoration of the first transposed Bloom filter rows;

dividing each of the second transposed Bloom filter rows by a divider c to generate for each of the second transposed Bloom filters, m words of n/c bits, when a restoration instruction is received at the receiving; and gathering the m words into groups according to arrangement position in the j second transposed Bloom filter rows and arranging the groups in an order following arrangement of the second transposed Bloom filters to transpose the j second transposed Bloom filter rows into a third transposed Bloom filter row integrating the j first transposed Bloom filter rows into 1 row.

10. The computer-readable, non-transitory medium according to claim 9, wherein the receiving includes receiving a storage request for the third transposed Bloom filter row, the dividing includes dividing the bit strings in each of the first transposed Bloom filters constituting the third transposed Bloom filter row by the divider c to generate, for each of the first transposed Bloom filters, c words, when a storage request for the third transposed Bloom filter row is received at the receiving, the gathering includes gathering the words according to arrangement position in the first transposed Bloom filters to generate a fourth transposed Bloom filter row of c second transposed Bloom filters of $\{(n/c) \times m \times j\}$ bits and storing the fourth transposed Bloom filter row to the storage device.

11. The computer-readable, non-transitory medium according to claim 9, wherein the receiving includes receiving a storage request for the third transposed Bloom filter row, the dividing includes dividing the third transposed Bloom filter row by the divider c to yield c first transposed Bloom filter rows and in each of the first transposed Bloom filter rows, dividing the bit strings in each of the first transposed Bloom filters by the divider c to generate c words of n/c bits for each of the first transposed Bloom filters, when a storage request for the third transposed Bloom filter row is received, the gathering includes gathering in each of the first transposed Bloom filter rows, the words according to arrangement position in the first transposed Bloom filters to yield c second transposed Bloom filter rows and storing the c second transposed Bloom filter rows to the storage device.

12. A computer-readable, non-transitory medium storing therein a search program that causes a computer to execute a process comprising:

converting, based on a plurality of hash functions, search data into position information indicating arrangement position in a transposed Bloom filter, the search data being converted for each of the hash functions;

designating from a transposed Bloom filter row and for each arrangement position indicated by the position information, a transposed Bloom filter that corresponds to the indicated arrangement position;

designating from a Bloom filter row, a Bloom filter that corresponds to the position information common to the designated transposed Bloom filters;

judging whether a transposed Bloom filter is present one (1) level below the transposed Bloom filter row, and wherein when a Bloom filter row constituted by the designated Bloom filter is not present, the judging includes judging whether the search data is present in a data block that is among the data block set and corresponds to the designated Bloom filter, and wherein the computer has access to a data block set that includes data groups respectively registered in data blocks, and a transposed Bloom filter row of m transposed Bloom filters each having n bits that indicate a negativity result in a given number of the data blocks and are gathered from n Bloom filters having m bits according to arrangement position in the Bloom filters where strings of bits gathered according to position are arranged in order of bit position.

13. The computer-readable, non-transitory medium according to claim 12, wherein the designating, when a Bloom filter row constituted by the designated Bloom filter is present, includes regarding the Bloom filter row as a designated Bloom filter row and regarding a Bloom filter row transposed from the designated Bloom filter row as a designated transposed Bloom filter row, from which and for each arrangement position indicated by the position information, a second designated transposed Bloom filter is designated that corresponds to the indicated arrangement position, and the designating includes designating from the designated Bloom filter row, a Bloom filter that corresponds to the position information common to the second designated transposed Bloom filters.

14. A search apparatus comprising:
a processor having access to a data block set that includes data groups respectively registered in data blocks, and a hierarchal Bloom filter configured in accordance with a memory area of h-levels by s-bits (h-levels×s-bits), where a bit-length s of each level of the hierarchal Bloom filter is divided based on a divider d of a highest level, being an h-th level, and a Bloom filter is a segment resulting from division based on the divider and segments at each level constitute a Bloom filter row, where n Bloom filters, included in a Bloom filter row, each have m bits indicating a negativity result in a given number of the data blocks, the processor configured to:
receive a transposition request for the Bloom filter row,
transpose the Bloom filter row into a transposed Bloom filter row of m transposed Bloom filters respectively of n bits gathered from the Bloom filters according to an arrangement position in the Bloom filters and stores the transposed Bloom filter row to a storage device where strings of bits gathered according to position are arranged in an order of bit position, when a transposition request has been received,
convert, based on a plurality of hash functions, search data into position information indicating the arrangement position in the transposed Bloom filter, the search data being converted for each of the hash functions,
designate from the transposed Bloom filter row and for each arrangement position indicated by the position information, a transposed Bloom filter that corresponds to the indicated arrangement position,
designate from the Bloom filter row, a Bloom filter that corresponds to the position information common to the designated transposed Bloom filter, and
judge whether a Bloom filter row constituted by the designated Bloom filter is present,
wherein when a Bloom filter row constituted by the designated Bloom filter is not present, judgment is made as to whether the search data is present in a data block that is among the data block set and corresponds to the designated Bloom filter.

15. The search apparatus according to claim 14, wherein the processor is configured to
divide the bits of each of the transposed Bloom filters by a divider c, which is a divisor of n, to generate c×m words of n/c bits,
receive a storage request for the transposed Bloom filter row, which is regarded as a first transposed Bloom filter row,
divide the bits of each of the first transposed Bloom filters by the divider c to generate c×m words of n/c bits, when a storage request is received,
gather the c×m words according to arrangement position in the first transposed Bloom filters to yield a second transposed Bloom filter row of c second transposed Bloom filters that each have {(n/c)×m} bits and
store the second transposed Bloom filter row to the storage device.

16. The search apparatus according to claim 14, wherein the processor is configured to
divide the bit strings in each of the transposed Bloom filters by a divider c, which is a divisor of n, to generate c×m×j words of n/c bits,
receive a storage request for j of the transposed Bloom filter rows, which are regarded as j first transposed Bloom filter rows,
divide the bit strings in each of the first transposed Bloom filters to generate c×m×j words of n/c bits, when a storage request is received,
gather words in each of the first transposed Bloom filter rows and according to arrangement position in each of the first transposed Bloom filters, yield a second transposed Bloom filter row of c second transposed Bloom filters of {(n/c)×m} bits and store to the storage device, the j second transposed Bloom filter rows,
receive a restoration instruction instructing restoration of the first transposed Bloom filter rows,
divide each of the second transposed Bloom filter rows by a divider c to generate for each of the second transposed Bloom filters, m words of n/c bits, when a restoration instruction is received unit, and
gather the m words into groups according to arrangement position in the j second transposed Bloom filter rows and arrange the groups in an order following arrangement of the second transposed Bloom filters to transpose the j second transposed Bloom filter rows into a third transposed Bloom filter row integrating the j first transposed Bloom filter rows into one (1)row.

* * * * *

UNITED STATES PATENT AND TRADEMARK OFFICE
CERTIFICATE OF CORRECTION

PATENT NO. : 8,560,558 B2
APPLICATION NO. : 13/064674
DATED : October 15, 2013
INVENTOR(S) : Takashi Watanabe et al.

It is certified that error appears in the above-identified patent and that said Letters Patent is hereby corrected as shown below:

Claims

Column 32, Line 24, Claim 2
Delete "1 ," and insert -- 1, --, therefor.

Column 32, Line 29, Claim 3
Delete "1 ," and insert -- 1, --, therefor.

Column 32, Line 49, Claim 5
Delete "1 ," and insert -- 1, --, therefor.

Column 33, Line 28, Claim 9
Delete "1 ," and insert -- 1, --, therefor.

Column 33, Line 54, Claim 9
Delete "1row." and insert -- 1 row. --, therefor.

Column 33, Line 62, Claim 10
Delete "words," and insert -- words of n/c bits, --, therefor.

Column 36, Line 36, Claim 16
Delete "unit," and insert -- , --, therefor.

Signed and Sealed this
Ninth Day of February, 2016

Michelle K. Lee
*Director of the United States Patent and Trademark Office*

CERTIFICATE OF CORRECTION (continued)
U.S. Pat. No. 8,560,558 B2

Column 36, Line 43, Claim 16

Delete "(1)row." and insert -- (1) row. --, therefor.